United States Patent
Fukunaga et al.

(10) Patent No.: US 9,926,038 B2
(45) Date of Patent: Mar. 27, 2018

(54) BICYCLE SPROCKET, BICYCLE REAR SPROCKET, AND BICYCLE MULTIPLE SPROCKET ASSEMBLY

(71) Applicant: SHIMANO INC., Sakai (JP)

(72) Inventors: Yasufumi Fukunaga, Sakai (JP); Tsuyoshi Fukumori, Sakai (JP); Koji Tokuyama, Sakai (JP); Sota Yamaguchi, Sakai (JP); Toshinari Oishi, Sakai (JP)

(73) Assignee: SHIMANO INC., Sakai (JP)

( * ) Notice: Subject to any disclaimer, the term of this patent is extended or adjusted under 35 U.S.C. 154(b) by 189 days.

(21) Appl. No.: 14/811,781

(22) Filed: Jul. 28, 2015

(65) Prior Publication Data

US 2017/0029066 A1  Feb. 2, 2017

(51) Int. Cl.
*B62M 9/10* (2006.01)
*F16H 55/30* (2006.01)

(52) U.S. Cl.
CPC ............ *B62M 9/10* (2013.01); *F16H 55/303* (2013.01)

(58) Field of Classification Search
CPC .......... B62M 9/10; B62M 9/12; F16H 55/303
See application file for complete search history.

(56) References Cited

U.S. PATENT DOCUMENTS

| | | | | |
|---|---|---|---|---|
| 5,192,248 A * | 3/1993 | Nagano | | B62M 9/10 474/140 |
| 8,550,944 B2 * | 10/2013 | Esquibel | | B62M 9/10 474/160 |
| 8,978,514 B2 * | 3/2015 | Shiraishi | | B62M 9/105 74/594.2 |
| 2005/0282671 A1 * | 12/2005 | Emura | | B62M 9/105 474/160 |
| 2007/0054768 A1 | 3/2007 | Miyazawa | | |
| 2007/0265122 A1 * | 11/2007 | Emura | | B62M 9/105 474/152 |
| 2009/0111631 A1 * | 4/2009 | Wickliffe | | B62M 9/105 474/152 |

(Continued)

FOREIGN PATENT DOCUMENTS

| | | |
|---|---|---|
| EP | 0047927 | 3/1982 |
| JP | 62-23187 U | 2/1987 |
| JP | 62-65387 U | 4/1987 |

*Primary Examiner* — William E Dondero
*Assistant Examiner* — Robert T Reese
(74) *Attorney, Agent, or Firm* — Mori & Ward, LLP

(57) ABSTRACT

A bicycle sprocket comprises a sprocket body, a plurality of sprocket teeth, and at least one chain-curvature limiting protuberance. The sprocket body is configured to be rotatable about a rotational center axis. The plurality of sprocket teeth extend radially outward from an outer periphery of the sprocket body. The at least one chain-curvature limiting protuberance is configured to limit axial curvature of a bicycle chain engaging with an independent neighboring bicycle sprocket which is adjacent to the bicycle sprocket without another sprocket between the bicycle sprocket and the independent neighboring bicycle sprocket. The axial curvature is curvature of the bicycle chain relative to the bicycle sprocket when viewed from a radial direction perpendicular to the rotational center axis. The at least one chain-curvature limiting protuberance is disposed on at least one of an outward facing side and an inward facing side.

50 Claims, 35 Drawing Sheets

(56) References Cited

U.S. PATENT DOCUMENTS

| | | |
|---|---|---|
| 2010/0004081 A1 | 1/2010 | Braedt |
| 2010/0137086 A1* | 6/2010 | Lin .................. B62M 9/105 474/160 |
| 2013/0139642 A1 | 6/2013 | Reiter et al. |
| 2014/0338494 A1* | 11/2014 | Sugimoto ............ B62M 1/36 74/594.2 |
| 2016/0207590 A1* | 7/2016 | Fukumori ........... F16H 55/30 |

* cited by examiner

BICYCLE SPROCKET, BICYCLE REAR SPROCKET, AND BICYCLE MULTIPLE SPROCKET ASSEMBLY

BACKGROUND OF THE INVENTION

Field of the Invention

The present invention relates to a bicycle sprocket, a bicycle rear sprocket, and a bicycle multiple sprocket assembly.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been recently redesigned is a bicycle sprocket.

Most bicycles have a drive train that uses the bicycle sprocket to transmit the pedaling action from the rider to a bicycle wheel through a bicycle chain. A front sprocket and a rear sprocket have been known as the bicycle sprocket. The bicycle sprocket generally includes a plurality of teeth to engage with the bicycle chain. Such sprockets have been also known in a technical field other than the bicycle field (e.g., Japanese Unexamined Patent Application Publications No. S62-023187 and No. S62-065387).

SUMMARY OF THE INVENTION

In accordance with a first aspect of the present invention, a bicycle sprocket has a rotational center axis, an outward facing side facing in an axial direction parallel to the rotational center axis, and an inward facing side facing in the axial direction. The inward facing side is opposite to the outward facing side in the axial direction. The bicycle sprocket comprises a sprocket body, a plurality of sprocket teeth, and at least one chain-curvature limiting protuberance. The sprocket body is configured to be rotatable about the rotational center axis. The plurality of sprocket teeth extend radially outward from an outer periphery of the sprocket body. The at least one chain-curvature limiting protuberance is configured to limit axial curvature of a bicycle chain engaging with an independent neighboring bicycle sprocket which is adjacent to the bicycle sprocket without another sprocket between the bicycle sprocket and the independent neighboring bicycle sprocket. The axial curvature is curvature of the bicycle chain relative to the bicycle sprocket when viewed from a radial direction perpendicular to the rotational center axis. The at least one chain-curvature limiting protuberance is disposed on at least one of the outward facing side and the inward facing side.

With the bicycle sprocket according to the first aspect, the at least one chain-curvature limiting protuberance can improve the holding function of the bicycle sprocket to hold the bicycle chain engaging with the independent neighboring bicycle sprocket.

In accordance with a second aspect of the present invention, the bicycle sprocket according to the first aspect is configured so that the at least one chain-curvature limiting protuberance is intermittently disposed on at least one of the outward facing side and the inward facing side in a circumferential direction with respect to the rotational center axis.

With the bicycle sprocket according to the second aspect, the bicycle sprocket can be designed to have at least one shifting facilitation area on which the at least one chain-curvature limiting protuberance is not disposed.

In accordance with a third aspect of the present invention, the bicycle sprocket according to the first or second aspect is configured so that the at least one chain-curvature limiting protuberance is disposed on the outward facing side.

In accordance with a fourth aspect of the present invention, the bicycle sprocket according to any one of the first to third aspects is configured so that the at least one chain-curvature limiting protuberance is disposed on the inward facing side.

In accordance with a fifth aspect of the present invention, the bicycle sprocket according to any one of the first to fourth aspects is configured so that the at least one chain-curvature limiting protuberance includes at least one first chain-curvature limiting protuberance and at least one second chain-curvature limiting protuberance. The at least one first chain-curvature limiting protuberance is disposed on the outward facing side. The at least one second chain-curvature limiting protuberance is disposed on the inward facing side.

In accordance with a sixth aspect of the present invention, the bicycle sprocket according to the fifth aspect further comprises at least one independent chain-curvature limiting protuberance configured to limit the axial curvature of the bicycle chain engaging with the bicycle sprocket. The at least one independent chain-curvature limiting protuberance is disposed on at least one of the outward facing side and the inward facing side.

In accordance with a seventh aspect of the present invention, the bicycle sprocket according to any one of the first to sixth aspects further comprises at least one independent chain-curvature limiting protuberance configured to limit the axial curvature of the bicycle chain engaging with the bicycle sprocket. The at least one independent chain-curvature limiting protuberance is disposed on at least one of the outward facing side and the inward facing side.

In accordance with an eighth aspect of the present invention, the bicycle sprocket according to the seventh aspect is configured so that the at least one independent chain-curvature limiting protuberance is disposed on the outward facing side and the inward facing side.

In accordance with a ninth aspect of the present invention, the bicycle sprocket according to the seventh or eighth aspect is configured so that the at least one independent chain-curvature limiting protuberance is disposed on the inward facing side.

In accordance with a tenth aspect of the present invention, the bicycle sprocket according to any one of the seventh to ninth aspects is configured so that the at least one independent chain-curvature limiting protuberance is disposed radially outwardly of the at least one chain-curvature limiting protuberance.

In accordance with an eleventh aspect of the present invention, the bicycle sprocket according to any one of the first to tenth aspects is configured so that an axial thickness of the at least one chain-curvature limiting protuberance is in a range of 0.10 mm to 0.15 mm.

In accordance with a twelfth aspect of the present invention, the bicycle sprocket according to the eleventh aspect is configured so that the axial thickness of the at least one chain-curvature limiting protuberance is 0.14 mm.

In accordance with a thirteenth aspect of the present invention, the bicycle sprocket according to any one of the ninth to twelfth aspects is configured so that the axial thickness of the at least one independent chain-curvature limiting protuberance is in a range of 0.20 mm to 0.30 mm.

In accordance with a fourteenth aspect of the present invention, the bicycle sprocket according to the thirteenth aspect is configured so that the axial thickness of the at least one independent chain-curvature limiting protuberance is 0.25 mm.

In accordance with a fifteenth aspect of the present invention, the bicycle sprocket according to any one of the ninth to fourteenth aspects is configured so that the axial thickness of the at least one chain-curvature limiting protuberance is smaller than the axial thickness of the at least one independent chain-curvature limiting protuberance.

In accordance with a sixteenth aspect of the present invention, the bicycle sprocket according to any one of the first to fifteenth aspects is configured so that the at least one chain-curvature limiting protuberance is provided on one of the outward facing side and the inward facing side with axial press working from the other of the outward facing side and the inward facing side toward the one of the outward facing side and the inward facing side.

In accordance with a seventeenth aspect of the present invention, the bicycle sprocket according to any one of the seventh to sixteenth aspects is configured so that the at least one independent chain-curvature limiting protuberance is provided on one of the outward facing side and the inward facing side with axial press working from the other of the outward facing side and the inward facing side toward the one of the outward facing side and the inward facing side.

In accordance with an eighteenth aspect of the present invention, the bicycle sprocket according to any one of the first to seventeenth aspects is configured so that the at least one chain-curvature limiting protuberance is a separate member from at least one of the sprocket body and the plurality of sprocket teeth and is attached to the at least one of the outward facing side and the inward facing side.

With the bicycle sprocket according to the eighteenth aspect, the at least one chain-curvature limiting protuberance is a separate member from at least one of the sprocket body and the plurality of sprocket teeth. Thus, it is possible to freely select a shape and/or a material of the at least one chain-curvature limiting protuberance.

In accordance with a nineteenth aspect of the present invention, the bicycle sprocket according to the eighteenth aspect is configured so that the at least one chain-curvature limiting protuberance includes a metallic material.

In accordance with a twentieth aspect of the present invention, the bicycle sprocket according to the nineteenth aspect is configured so that the at least one chain-curvature limiting protuberance is attached to the at least one of the outward facing side and the inward facing side via one of adhesive, diffusion bonding, and caulking.

In accordance with a twenty-first aspect of the present invention, the bicycle sprocket according to any one of the eighteenth to twentieth aspects is configured so that the at least one chain-curvature limiting protuberance includes a non-metallic material.

In accordance with a twenty-second aspect of the present invention, the bicycle sprocket according to the twenty-first aspect is configured so that the at least one chain-curvature limiting protuberance is attached to the at least one of the outward facing side and the inward facing side via one of adhesive and integral molding.

In accordance with a twenty-third aspect of the present invention, the bicycle sprocket according to any one of the seventh to twenty-second aspects is configured so that the at least one independent chain-curvature limiting protuberance is a separate member from at least one of the sprocket body and the plurality of sprocket teeth and is attached to the at least one of the outward facing side and the inward facing side.

With the bicycle sprocket according to the twenty-third aspect, the at least one independent chain-curvature limiting protuberance is a separate member from at least one of the sprocket body and the plurality of sprocket teeth. Thus, it is possible to freely select a shape and/or a material of the at least one independent chain-curvature limiting protuberance.

In accordance with a twenty-fourth aspect of the present invention, the bicycle sprocket according to the twenty-third aspect is configured so that the at least one independent chain-curvature limiting protuberance includes a metallic material.

In accordance with a twenty-fifth aspect of the present invention, the bicycle sprocket according to the twenty-fourth aspect is configured so that the at least one independent chain-curvature limiting protuberance is attached to the at least one of the outward facing side and the inward facing side via one of adhesive, diffusion bonding, and caulking.

In accordance with a twenty-sixth aspect of the present invention, the bicycle sprocket according to any one of the twenty-third to twenty-fifth aspects is configured so that the at least one independent chain-curvature limiting protuberance includes a non-metallic material.

In accordance with a twenty-seventh aspect of the present invention, the bicycle sprocket according to the twenty-sixth aspect is configured so that the at least one independent chain-curvature limiting protuberance is attached to the at least one of the outward facing side and the inward facing side via one of adhesive and integral molding.

In accordance with a twenty-eighth aspect of the present invention, the bicycle sprocket according to any one of the sixth to twenty-seventh aspects is configured so that one of the at least one independent chain-curvature limiting protuberance is provided on one of the outward facing side and the inward facing side with axial press working from the other of the outward facing side and the inward facing side toward the one of the outward facing side and the inward facing side. Another of the at least one independent chain-curvature limiting protuberance is a separate member from at least one of the sprocket body and the plurality of sprocket teeth and is attached to the other of the outward facing side and the inward facing side.

In accordance with a twenty-ninth aspect of the present invention, the bicycle sprocket according to any one of the first to twenty-eighth aspects is configured so that the bicycle sprocket is a bicycle rear sprocket.

In accordance with a thirtieth aspect of the present invention, a bicycle multiple sprocket assembly comprises a first sprocket and a second sprocket. The first sprocket has a rotational center axis, a first outward facing side facing in an axial direction parallel to the rotational center axis, and a first inward facing side facing in the axial direction. The first inward facing side is opposite to the first outward facing side in the axial direction. The first sprocket comprises a first sprocket body, a plurality of first sprocket teeth, at least one first chain-curvature limiting protuberance, and at least one first independent chain-curvature limiting protuberance. The plurality of first sprocket teeth extend radially outward from an outer periphery of the first sprocket body. The at least one first chain-curvature limiting protuberance is disposed on the first outward facing side. The at least one first independent chain-curvature limiting protuberance is disposed on the first inward facing side. The second sprocket is adjacent to the first sprocket without another sprocket between the first sprocket and the second sprocket. The second sprocket has the rotational center axis, a second outward facing side facing in the axial direction, and a second inward facing side facing in the axial direction. The second inward facing side is opposite to the second outward facing side in the axial direction. The second inward facing side faces the first outward facing side in the axial direction. The second bicycle sprocket comprises a second sprocket body and a plurality of second sprocket teeth. The plurality of second sprocket teeth extend radially outward from an outer periphery of the second sprocket body. A total number of the plurality of second sprocket teeth is less than a total number of the plurality of first sprocket teeth by two or more. The at least one first chain-curvature limiting protuberance is configured to limit axial curvature of a bicycle chain engaging with the second sprocket. The axial curvature is curvature of the bicycle chain relative to the bicycle multiple sprocket assembly when viewed from a radial direction perpendicular to the rotational center axis. The at least one first independent chain-curvature limiting protuberance is configured to limit the axial curvature of the bicycle chain engaging with the first sprocket.

With the bicycle multiple sprocket assembly according to the thirtieth aspect, the at least one first chain-curvature limiting protuberance is configured to limit axial curvature of a bicycle chain engaging with the second sprocket. The at least one first independent chain-curvature limiting protuberance is configured to limit the axial curvature of the bicycle chain engaging with the first sprocket. Accordingly, it is possible to improve the holding function of the bicycle sprocket to hold the bicycle multiple sprocket assembly.

In accordance with a thirty-first aspect of the present invention, the bicycle multiple sprocket assembly according to the thirtieth aspect is configured so that the at least one first independent chain-curvature limiting protuberance is disposed on the first inward facing side and the first outward facing side.

In accordance with a thirty-second aspect of the present invention, the bicycle multiple sprocket assembly according to the thirtieth or thirty-first aspect further comprises a third sprocket adjacent to the second sprocket without another sprocket between the second sprocket and the third sprocket. The third sprocket has the rotational center axis. The third sprocket comprises a third sprocket body and a plurality of third sprocket teeth extending radially outward from an outer periphery of the third sprocket body. A total number of the plurality of third sprocket teeth is less than the total number of the plurality of second sprocket teeth by two or more. The second sprocket comprises at least one second independent chain-curvature limiting protuberance disposed on the second inward facing side. The at least one second independent chain-curvature limiting protuberance is configured to limit the axial curvature of the bicycle chain engaging with the second sprocket. The second sprocket is free from a chain-curvature limiting protuberance configured to limit the axial curvature of the bicycle chain engaging with at least one of the first sprocket and the third sprocket.

In accordance with a thirty-third aspect of the present invention, the bicycle multiple sprocket assembly according to any one of the thirtieth to thirty-second aspects further comprises a third sprocket and a fourth sprocket. The third sprocket is adjacent to the second sprocket without another sprocket between the second sprocket and the third sprocket. The third sprocket has the rotational center axis. The third sprocket comprises a third sprocket body and a plurality of third sprocket teeth extending radially outward from an outer periphery of the third sprocket body. The fourth sprocket is adjacent to the third sprocket without another sprocket between the third sprocket and the fourth sprocket. The fourth sprocket has the rotational center axis. The fourth sprocket comprises a fourth sprocket body and a plurality of fourth sprocket teeth extending radially outward from an outer periphery of the fourth sprocket body. A total number of the plurality of fourth sprocket teeth is less than the total number of the plurality of third sprocket teeth by one. The third sprocket is free from a chain-curvature limiting protuberance configured to limit the axial curvature of the bicycle chain engaging with at least one of the second sprocket and the fourth sprocket.

In accordance with a thirty-fourth aspect of the present invention, a bicycle rear sprocket has a rotational center axis, an outward facing side facing in an axial direction parallel to the rotational center axis and an inward facing side facing in the axial direction. The inward facing side is opposite to the outward facing side in the axial direction. The bicycle rear sprocket comprises a sprocket body, a plurality of sprocket teeth, and at least one chain-curvature limiting protuberance. The plurality of sprocket teeth extend radially outward from an outer periphery of the sprocket body. The at least one chain-curvature limiting protuberance is disposed on at least one of the outward facing side and the inward facing side. The at least one chain-curvature limiting protuberance is a separate member from at least one of the sprocket body and the plurality of sprocket teeth and attached to the at least one of the outward facing side and the inward facing side.

With the bicycle rear sprocket according to the thirty-fourth aspect, the at least one chain-curvature limiting protuberance is a separate member from at least one of the sprocket body and the plurality of sprocket teeth. Thus, it is possible to freely select a shape and/or a material of the at least one chain-curvature limiting protuberance.

In accordance with a thirty-fifth aspect of the present invention, a bicycle multiple sprocket assembly comprise a first sprocket element and a second sprocket element. The first sprocket element has a rotational center axis. The first sprocket element comprises a first body and a plurality of first teeth extending radially outward from an outer periphery of the first body. The plurality of first teeth include a first recessed tooth. The second sprocket element is adjacent to the first sprocket element without another sprocket between the first sprocket element and the second sprocket element. The first recessed tooth is configured to facilitate shifting a bicycle chain from the first sprocket element to a neighboring sprocket element adjacent to the first sprocket element without another sprocket element between the first sprocket element and the neighboring sprocket element. The second sprocket element has the rotational center axis. The second sprocket element comprises a second body and a plurality of second teeth extending radially outward from an outer periphery of the second body. A total number of the plurality of second teeth is less than a total number of the plurality of first teeth. The plurality of second teeth include a second recessed tooth configured to facilitate shifting the bicycle chain from the second sprocket element to a third sprocket element adjacent to the second sprocket element without another sprocket between the second sprocket element and the third sprocket element. The third sprocket element includes a plurality of third teeth. A total number of the plurality of third teeth is less than the total number of the plurality of second teeth. The first recessed tooth is configured to facilitate shifting the bicycle chain from the second sprocket element to the third sprocket element.

With the bicycle multiple sprocket assembly according to the thirty-fifth aspect, the first recessed tooth of the first sprocket element is configured to facilitate shifting the bicycle chain from the second sprocket element to the third sprocket element besides to facilitate shifting the bicycle chain from the first sprocket element to the second sprocket element or to a neighboring sprocket element opposite to the second sprocket element with respect to the first sprocket element. The second recessed tooth of the second sprocket element is configured to facilitate shifting the bicycle chain from the second sprocket element to the third sprocket element. Accordingly, it is possible to effectively facilitate shifting the bicycle chain from the second sprocket element to the third sprocket element.

In accordance with a thirty-sixth aspect of the present invention, the bicycle multiple sprocket assembly according to the thirty-fifth aspect is configured so that the first recessed tooth is configured to facilitate upshifting from the first sprocket element.

In accordance with a thirty-seventh aspect of the present invention, the bicycle multiple sprocket assembly according to the thirty-fifth or thirty-sixth aspect is configured so that the first recessed tooth is configured to facilitate downshifting from the first sprocket element.

In accordance with a thirty-eighth aspect of the present invention, the bicycle multiple sprocket assembly according to any one of the thirty-fifth to thirty-seventh aspects is configured so that the second recessed tooth is configured to facilitate upshifting from the second sprocket element.

In accordance with a thirty-ninth aspect of the present invention, the bicycle multiple sprocket assembly according to any one of the thirty-fifth to thirty-eighth aspects further comprises the third sprocket element having the rotational center axis. The third sprocket element comprises a third body and the plurality of third teeth extending radially outward from an outer periphery of the third body. The plurality of third teeth include a third recessed tooth configured to facilitate shifting the bicycle chain from the second sprocket element to the third sprocket element.

In accordance with a fortieth aspect of the present invention, the bicycle multiple sprocket assembly according to the thirty-ninth aspect is configured so that the third recessed tooth faces the second sprocket element in an axial direction parallel to the rotational center axis.

In accordance with a forty-first aspect of the present invention, the bicycle multiple sprocket assembly according to the thirty-ninth or fortieth aspect is configured so that the first recessed tooth is provided on a downstream side of the third recessed tooth in a driving rotational direction in which the bicycle multiple sprocket assembly rotates about the rotational center axis during pedaling.

In accordance with a forty-second aspect of the present invention, the bicycle multiple sprocket assembly according to any one of the thirty-fifth to forty-first aspect is configured so that the first recessed tooth faces the second sprocket element in an axial direction parallel to the rotational center axis.

In accordance with a forty-third aspect of the present invention, the bicycle multiple sprocket assembly according to any one of the thirty-fifth to forty-second aspects is configured so that the second recessed tooth faces the third sprocket in an axial direction parallel to the rotational center axis.

In accordance with a forty-fourth aspect of the present invention, the bicycle multiple sprocket assembly according to any one of the thirty-fifth to forty-third aspects is configured so that the first recessed tooth is provided on a downstream side of the second recessed tooth in a driving rotational direction in which the bicycle multiple sprocket assembly rotates about the rotational center axis during pedaling.

In accordance with a forty-fifth aspect of the present invention, the bicycle multiple sprocket assembly according to any one of the thirty-ninth to forty-fourth aspects is configured so that the second recessed tooth is provided on a downstream side of the third recessed tooth in a driving rotational direction in which the bicycle multiple sprocket assembly rotates about the rotational center axis during pedaling.

In accordance with a forty-sixth aspect of the present invention, the bicycle multiple sprocket assembly according to any one of the thirty-firth to forty-fifth aspects is configured so that the bicycle multiple sprocket assembly is a bicycle rear sprocket assembly.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
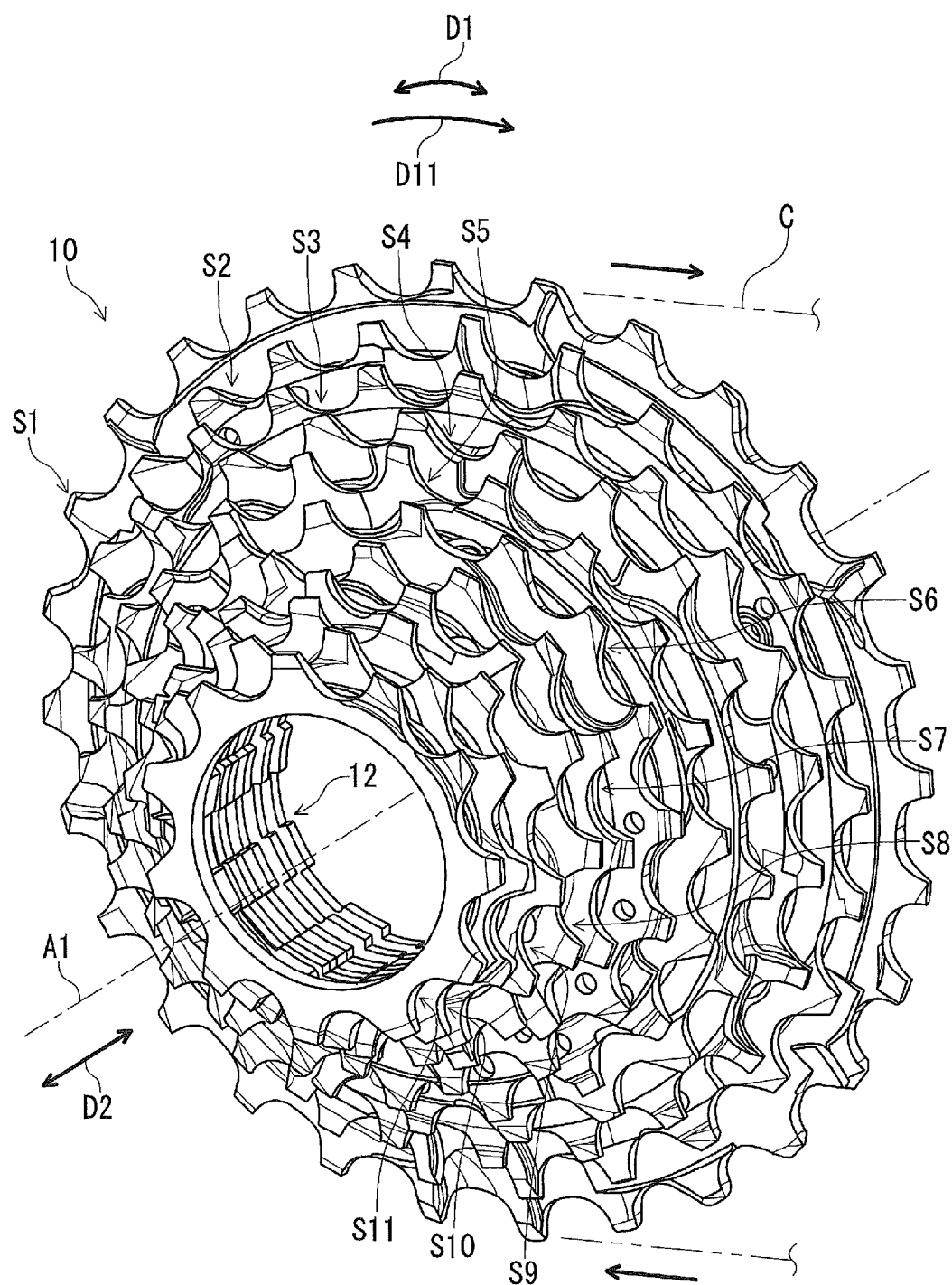
FIG. 1 is a perspective view of a bicycle multiple sprocket assembly in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle multiple sprocket assembly 10 in accordance with a first embodiment comprises a plurality of the bicycle sprockets. The bicycle multiple sprocket assembly 10 is configured to engage with a bicycle chain C. In this embodiment, the bicycle multiple sprocket assembly 10 comprises eleven bicycle sprockets S1 to S11. The bicycle multiple sprocket assembly 10 has a rotational center axis A1. The bicycle multiple sprocket assembly 10 is configured to be rotatable about the rotational center axis A1 in a driving rotational direction D11 during the pedaling. The driving rotational direction D11 is defined along a circumferential direction D1 of the bicycle multiple sprocket assembly 10.

Figure 2:
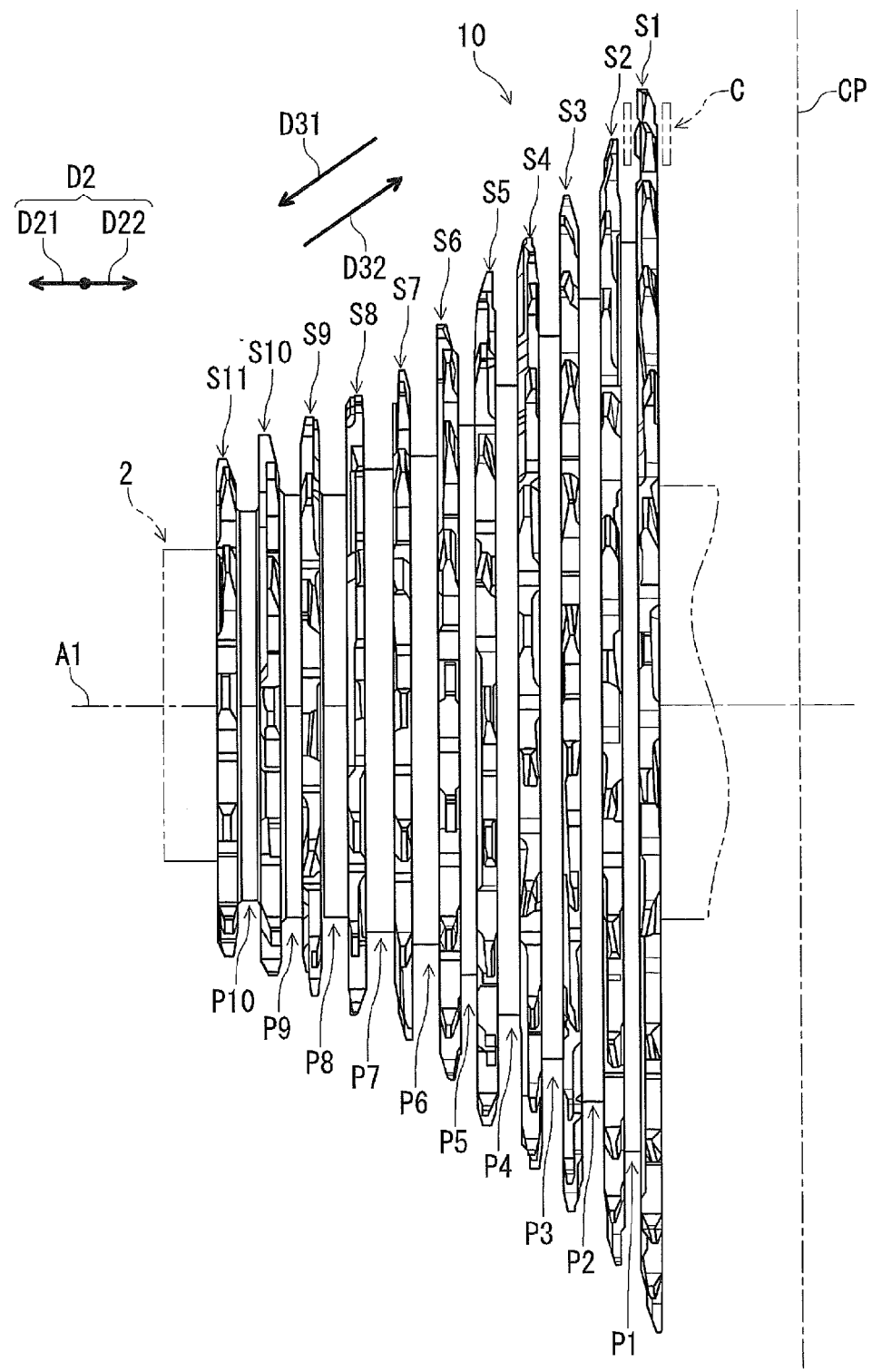
FIG. 2 is a front elevational view of the bicycle multiple sprocket assembly.

As seen in FIG. 1, the bicycle multiple sprocket assembly 10 further comprises a hub engagement structure 12 configured to engage with a bicycle hub assembly 2 (FIG. 2). While the bicycle multiple sprocket assembly 10 is a bicycle rear sprocket assembly in the illustrated embodiment, structures of the bicycle multiple sprocket assembly 10 can be applied to a front sprocket assembly if needed and/or desired. Each of the bicycle sprockets S1 to S11 is a bicycle rear sprocket in this embodiment, and the structures of the bicycle sprockets S1 to S11 can be applied to a bicycle front sprocket.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle multiple sprocket assembly 10 or the bicycle sprockets S1 to S11, should be interpreted relative to the bicycle equipped with the bicycle multiple sprocket assembly 10 or the bicycle sprockets S1 to S11 as used in an upright riding position on a horizontal surface.

As seen in FIG. 2, the bicycle sprockets S1 to S11 are arranged in an axial direction D2 parallel to the rotational center axis A1. The bicycle sprockets S1 to S11 are spaced apart from each other in the axial direction D2. The bicycle multiple sprocket assembly 10 includes spacers P1 to P10. Each of the spacers P1 to P10 is arranged between adjacent two sprockets of the bicycle sprockets S1 to S11. Instead of such spacers, a sprocket support member to which a plurality of bicycle sprockets are mounted can also be used.

The bicycle sprocket S1 has an outer diameter which is largest in the bicycle sprockets S1 to S11. The bicycle sprocket S11 has an outer diameter which is smallest in the bicycle sprockets S1 to S11. The bicycle sprocket S1 is closer to a bicycle center plane CP of a bicycle frame (not shown) than the bicycle sprocket S11 in a state where the bicycle multiple sprocket assembly 10 is mounted to the bicycle hub assembly 2. Upshifting occurs when the bicycle chain C is shifted by a rear derailleur (not shown) from a larger sprocket to a neighboring smaller sprocket in an upshifting direction D31. Downshifting occurs when the bicycle chain C is shifted by the rear derailleur from a small sprocket to a neighboring larger sprocket in a downshifting direction D32.

The axial direction D2 includes an outward axial direction D21 and an inward axial direction D22. The inward axial direction D22 is opposite to the outward axial direction D21. The upshifting direction D31 is defined along the outward axial direction D21. The downshifting direction D32 is defined along the inward axial direction D22.

Figure 3:
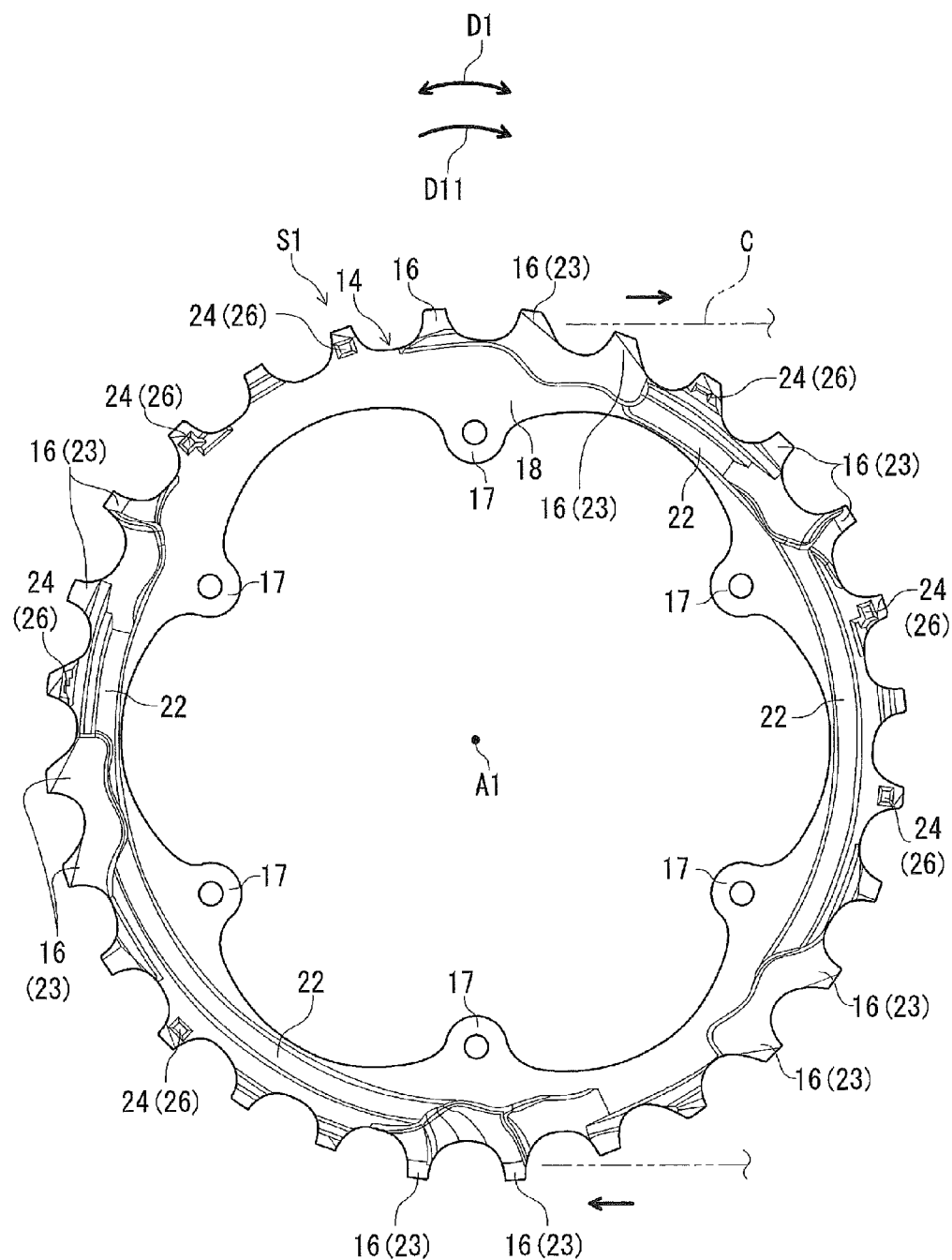
FIG. 3 is a right side elevational view of a bicycle sprocket of the bicycle multiple sprocket assembly.
Figure 4:
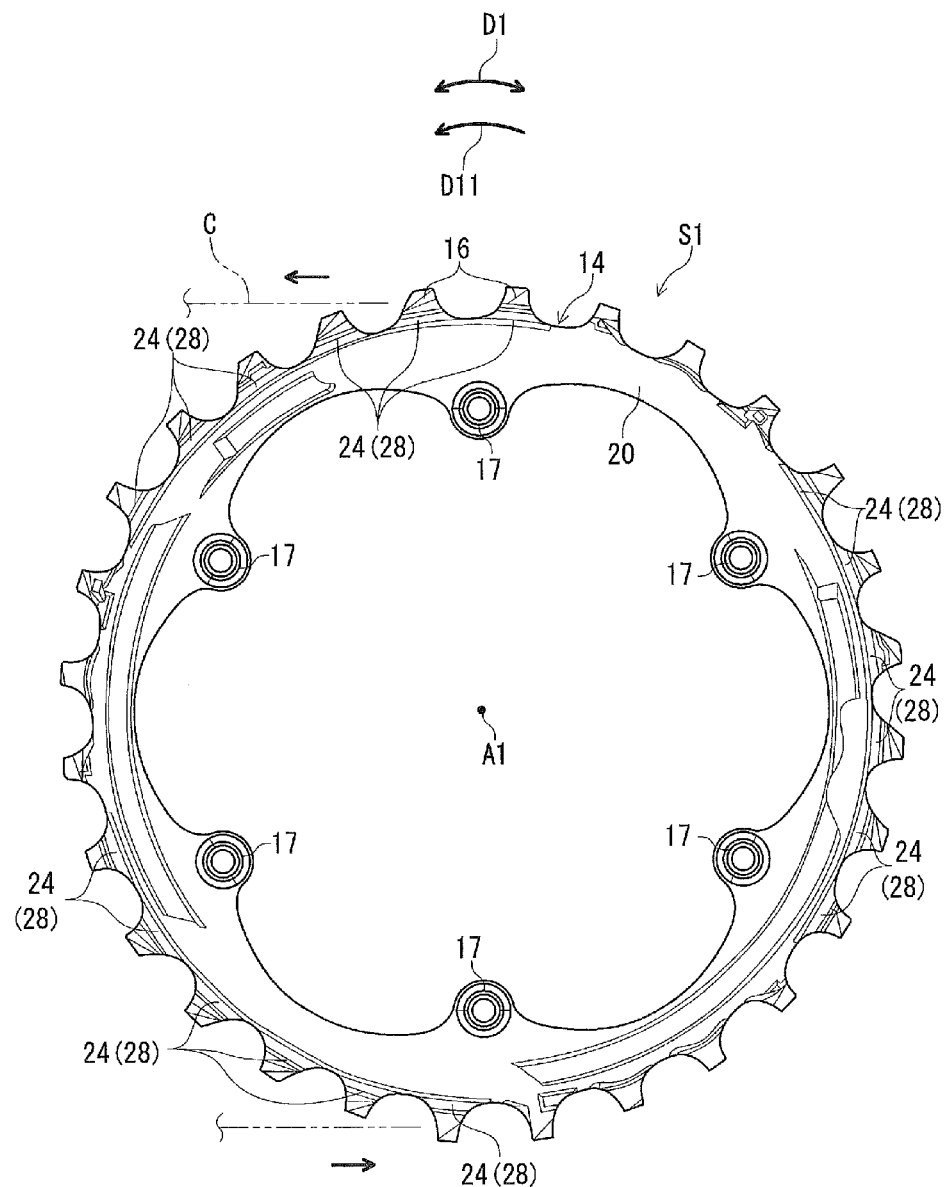
FIG. 4 is a left side elevational view of the bicycle sprocket illustrated in FIG. 3.

As seen in FIGS. 3 and 4, the bicycle sprocket S1 has the rotational center axis A1. The bicycle sprocket S1 is configured to be rotatable about the rotational center axis A1. The bicycle sprocket S1 comprises a sprocket body 14 and a plurality of sprocket teeth 16. The sprocket body 14 is configured to be rotatable about the rotational center axis A1. The plurality of sprocket teeth 16 extend radially outward from an outer periphery of the sprocket body 14.

The sprocket body 14 has an annular shape. The bicycle sprocket S1 includes securing parts 17 extending radially inward from an inner periphery of the sprocket body 14. The securing parts 17 are spaced apart from each other in the circumferential direction D1. The bicycle sprocket S1 is secured to the bicycle sprocket S2 (FIG. 2) via the securing parts 17.

Figure 5:
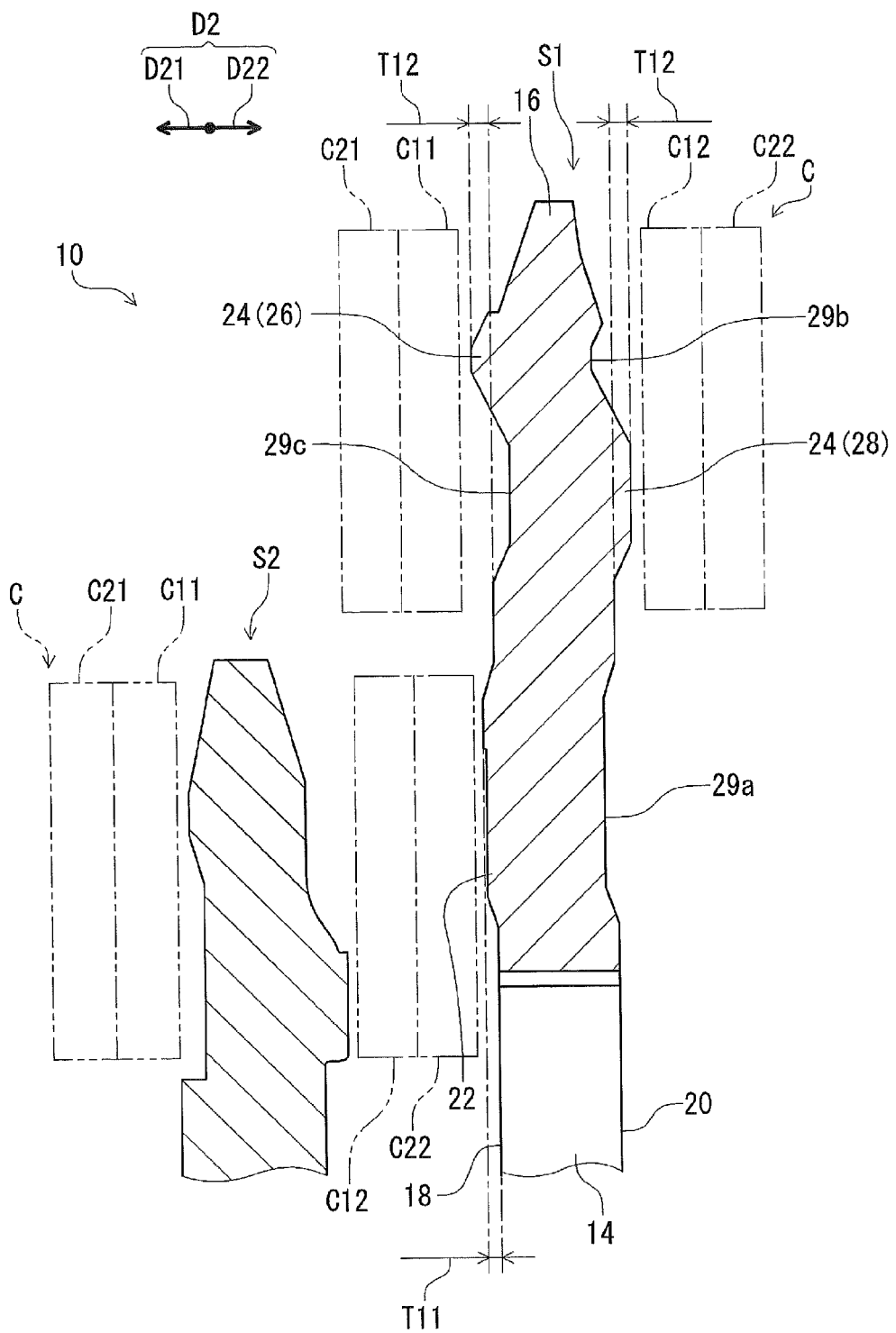
FIG. 5 is a partial cross-sectional view of the bicycle sprocket illustrated in FIG. 3 and another bicycle sprocket.

As seen in FIG. 5, the bicycle sprocket S1 has an outward facing side 18 and an inward facing side 20. The outward facing side 18 faces in the axial direction D2 parallel to the rotational center axis A1. The inward facing side 20 faces in the axial direction D2. The inward facing side 20 is opposite to the outward facing side 18 in the axial direction D2. In this embodiment, the outward facing side 18 faces in the outward axial direction D21. The inward facing side 20 faces in the inward axial direction D22.

The bicycle sprocket S1 comprises at least one chain-curvature limiting protuberance 22. The at least one chain-curvature limiting protuberance 22 is configured to limit axial curvature of the bicycle chain C engaging with an independent neighboring bicycle sprocket S2 which is adjacent to the bicycle sprocket S1 without another sprocket between the bicycle sprocket S1 and the independent neighboring bicycle sprocket S2. In this embodiment, the bicycle sprocket S1 comprises a plurality of chain-curvature limiting protuberances 22 configured to limit the axial curvature of the bicycle chain C engaging with the independent neighboring bicycle sprocket S2.

Figure 6:
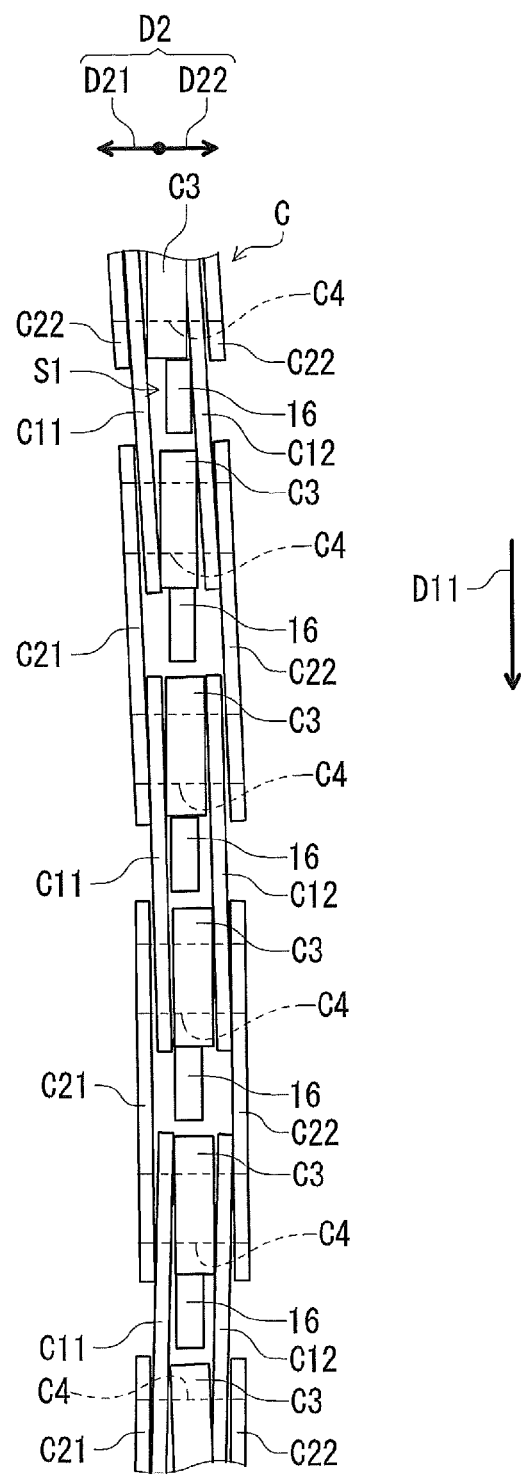
FIG. 6 is a schematic diagram showing one example of axial curvature of a bicycle chain.

As seen in FIG. 6, the axial curvature is curvature of the bicycle chain C relative to the bicycle sprocket S1 when viewed from a radial direction perpendicular to the rotational center axis A1. The bicycle chain C includes opposed pairs of inner link plates C11 and C12, opposed pairs of outer link plates C21 and C22, rollers C3, and link pins C4. The bicycle chain C includes clearances between each elements C11, C12, C21, C22, C3, and C4. The clearances cause the axial curvature of the bicycle chain C. The concept of the axial curvature can be applied to other sprockets S2 to S11.

As seen in FIG. 3, the at least one chain-curvature limiting protuberance 22 is intermittently disposed on at least one of the outward facing side 18 and the inward facing side 20 in the circumferential direction D1 with respect to the rotational center axis A1. In this embodiment, the chain-curvature limiting protuberances 22 are intermittently disposed on the outward facing side 18 in the circumferential direction D1 with respect to the rotational center axis A1. Accordingly, the bicycle sprocket S1 can be designed to have a shifting facilitation area on which the at least one chain-curvature limiting protuberance is not disposed.

The plurality of sprocket teeth 16 include recessed teeth 23 configured to facilitate shifting the bicycle chain C. The recessed teeth 23 is configured to facilitate upshifting from the bicycle sprocket S1 to the bicycle sprocket S2 and/or is configured to facilitate downshifting from the bicycle sprocket S2 to the bicycle sprocket S1. The recessed teeth 23 are disposed between the chain-curvature limiting protuberances 22 and form a shifting facilitation area on which the chain-curvature limiting protuberance 22 is not disposed.

As seen in FIG. 5, the at least one chain-curvature limiting protuberance 22 is disposed on at least one of the outward facing side 18 and the inward facing side 20. In this embodiment, the at least one chain-curvature limiting protuberance 22 is disposed on the outward facing side 18. The chain-curvature limiting protuberances 22 are contactable with outer surfaces of the outer link plates C22 of the bicycle chain C in a state where the bicycle chain C is engaged with the bicycle sprocket S2.

As seen in FIG. 5, the bicycle sprocket S1 further comprises at least one independent chain-curvature limiting protuberance 24. The at least one independent chain-curvature limiting protuberance 24 is configured to limit the axial curvature of the bicycle chain C engaging with the bicycle sprocket S1. In this embodiment, the bicycle sprocket S1 further comprises independent chain-curvature limiting protuberances 24 configured to limit the axial curvature of the bicycle chain C engaging with the bicycle sprocket S1.

The at least one independent chain-curvature limiting protuberance 24 is disposed on at least one of the outward facing side 18 and the inward facing side 20. In this embodiment, the at least one independent chain-curvature limiting protuberance 24 is disposed on the outward facing side 18 and the inward facing side 20.

As seen in FIG. 5, the independent chain-curvature limiting protuberances 24 are disposed on the outward facing side 18 and the inward facing side 20. Specifically, the independent chain-curvature limiting protuberances 24 include first independent chain-curvature limiting protuberances 26 and second independent chain-curvature limiting protuberances 28. The first independent chain-curvature limiting protuberances 26 are disposed on the outward facing side 18. The second independent chain-curvature limiting protuberances 28 are disposed on the inward facing side 20.

The at least one independent chain-curvature limiting protuberance 24 is disposed radially outwardly of the at least one chain-curvature limiting protuberance 22. In this embodiment, the independent chain-curvature limiting protuberances 24 are disposed radially outwardly of the at least one chain-curvature limiting protuberance 22.

As seen in FIG. 5, an axial thickness T11 of the at least one chain-curvature limiting protuberance 22 is in a range of 0.10 mm to 0.15 mm. In this embodiment, the axial thickness T11 of the at least one chain-curvature limiting protuberance 22 is 0.14 mm. However, the axial thickness T11 of the at least one chain-curvature limiting protuberance 22 can be in a range of approximately 0.10 mm to approximately 0.15 mm. The axial thickness T11 of the at least one chain-curvature limiting protuberance 22 can be approximately 0.14 mm. The axial thickness T11 of the at least one chain-curvature limiting protuberance 22 is defined as a maximum axial thickness of the at least one chain-curvature limiting protuberance 22 defined from the outward facing side 18 in the axial direction D2.

An axial thickness T12 of the at least one independent chain-curvature limiting protuberance 24 is in a range of 0.20 mm to 0.30 mm. In this embodiment, the axial thickness T12 of the at least one independent chain-curvature limiting protuberance 24 is 0.25 mm. However, the axial thickness T12 of the at least one independent chain-curvature limiting protuberance 24 can be in a range of approximately 0.20 mm to approximately 0.30 mm. The axial thickness T12 of the at least one independent chain-curvature limiting protuberance 24 can be approximately 0.25 mm. The axial thickness T12 of the at least one independent chain-curvature limiting protuberance 24 is defined as a maximum axial thickness of the at least one independent chain-curvature limiting protuberance 24 defined from one of the outward facing side 18 and the inward facing side 20 in the axial direction D2.

In this embodiment, the axial thickness T12 of the first independent chain-curvature limiting protuberance 26 is equal to the axial thickness T12 of the second independent chain-curvature limiting protuberance 28. However, the axial thickness T12 of the first independent chain-curvature limiting protuberance 26 can be substantially equal to or different from the axial thickness T12 of the second independent chain-curvature limiting protuberance 28.

The axial thickness T11 of the at least one chain-curvature limiting protuberance 22 is smaller than the axial thickness T12 of the at least one independent chain-curvature limiting protuberance 24. However, the axial thickness T11 of the at least one chain-curvature limiting protuberance 22 can be equal to or larger than the axial thickness T12 of the at least one of independent chain-curvature limiting protuberances 24.

In this embodiment, as seen in FIG. 5, the at least one chain-curvature limiting protuberance 22 is provided on one of the outward facing side 18 and the inward facing side 20 with axial press working from the other of the outward facing side 18 and the inward facing side 20 toward the one of the outward facing side 18 and the inward facing side 20. The at least one chain-curvature limiting protuberance 22 is provided on the outward facing side 18 with axial press working from the inward facing side 20 toward the outward facing side 18. The bicycle sprocket S1 includes a recess 29a provided on an opposite side of the chain-curvature limiting protuberance 22 in the axial direction D2. In this embodiment, the recess 29a is provided on the inward facing side 20 and is formed by the axial press working.

Furthermore, the first independent chain-curvature limiting protuberance 26 is provided the outward facing side 18 with axial press working from the inward facing side 20 toward the outward facing side 18. The bicycle sprocket S1 includes a recess 29b provided on an opposite side of the first independent chain-curvature limiting protuberance 26 in the axial direction D2. In this embodiment, the recess 29b is provided on the inward facing side 20 and is formed by the axial press working.

The second independent chain-curvature limiting protuberance 28 is provided the inward facing side 20 with axial press working from the outward facing side 18 toward the inward facing side 20. The bicycle sprocket S1 includes a recess 29c provided on an opposite side of the second independent chain-curvature limiting protuberance 28 in the axial direction D2. In this embodiment, the recess 29c is provided on the outward facing side 18 and is formed by the axial press working.

Figure 7:
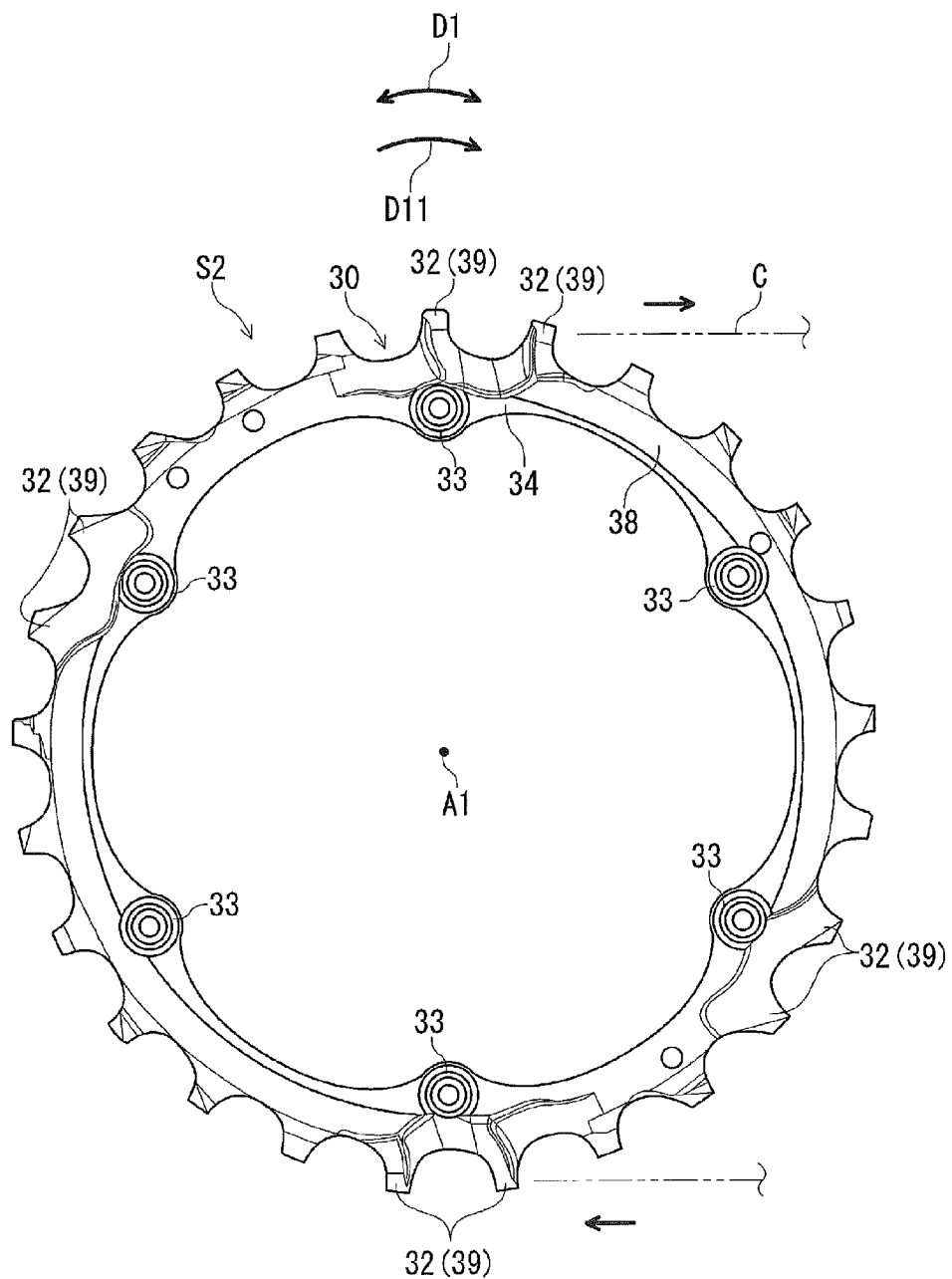
FIG. 7 is a right side elevational view of a bicycle sprocket of the bicycle multiple sprocket assembly.
Figure 8:
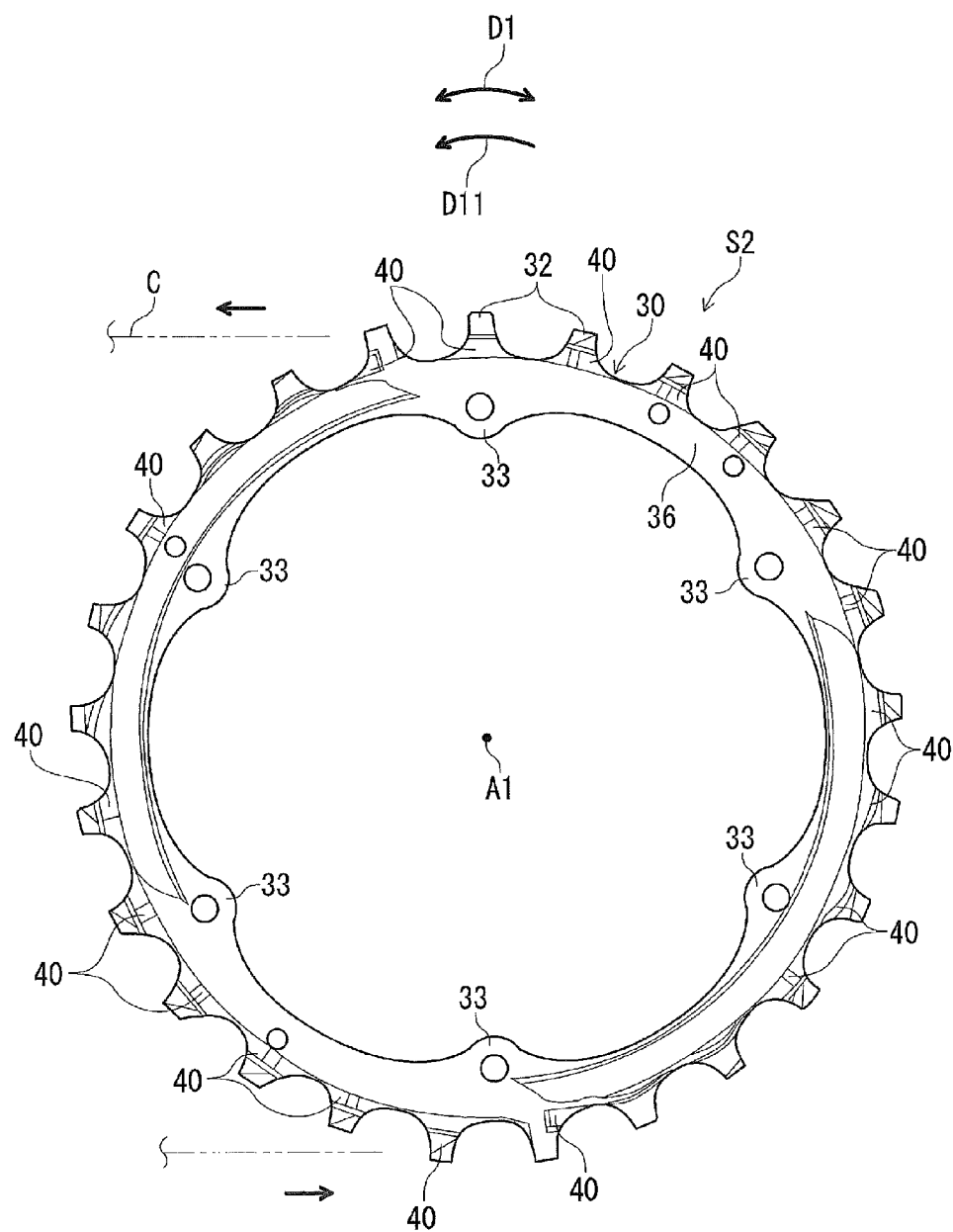
FIG. 8 is a left side elevational view of the bicycle sprocket illustrated in FIG. 7.

As seen in FIGS. 7 and 8, the bicycle sprocket S2 has the rotational center axis A1. The bicycle sprocket S2 is configured to be rotatable about the rotational center axis A1. The bicycle sprocket S2 comprises a sprocket body 30 and a plurality of sprocket teeth 32. The sprocket body 30 is configured to be rotatable about the rotational center axis A1. The plurality of sprocket teeth 32 extend radially outward from an outer periphery of the sprocket body 30.

In a case where the bicycle sprockets S1 and S2 can also be respectively referred to as a first sprocket S1 and a second sprocket S2, the sprocket bodies 14 and 30 can also be respectively referred to as a first sprocket body 14 and a second sprocket body 30. The plurality of sprocket teeth 16 and 32 can also be respectively referred to as a plurality of first sprocket teeth 16 and a plurality of second sprocket teeth 32. The at least one chain-curvature limiting protuberance 22 and the at least one independent chain-curvature limiting protuberance 24 can also be respectively referred to as at least one first chain-curvature limiting protuberance 22 and at least one first independent chain-curvature limiting protuberance 24.

In this case, as seen in FIGS. 3 and 7, a total number of the plurality of second sprocket teeth 32 is less than a total number of the plurality of first sprocket teeth 16 by two or more (a condition CD1). Specifically, the total number of the plurality of first sprocket teeth 16 is twenty eight. The total number of the plurality of second sprocket teeth 32 is twenty five. Furthermore, the at least one first chain-curvature limiting protuberance 22 is configured to limit the axial curvature of the bicycle chain C engaging with the second sprocket S2. The at least one first independent chain-curvature limiting protuberance 24 is configured to limit the axial curvature of the bicycle chain C engaging with the first sprocket S1. If the condition CD1 is satisfied, other bicycle sprockets can be referred to as the first sprocket and the second sprocket.

The sprocket body 30 has an annular shape. The bicycle sprocket S2 includes securing parts 33 extending radially inward from an inner periphery of the sprocket body 30. The securing parts 33 are spaced apart from each other in the circumferential direction D1. The bicycle sprocket S1 is secured to the bicycle sprockets S1 and S3 (FIG. 2) via the securing parts 33.

Figure 9:
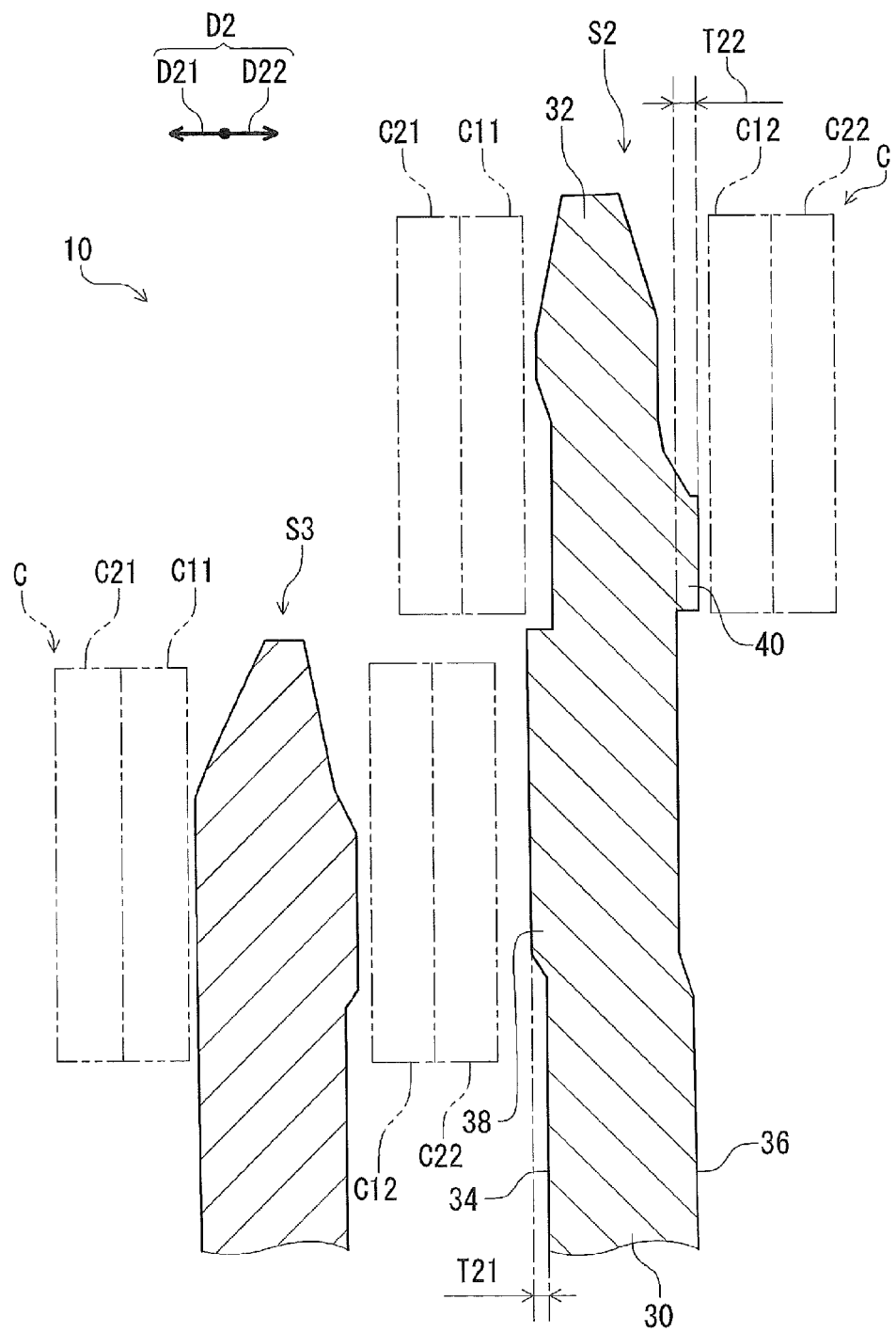
FIG. 9 is a partial cross-sectional view of the bicycle sprocket illustrated in FIG. 7 and another bicycle sprocket.

As seen in FIG. 9, the bicycle sprocket S2 has an outward facing side 34 and an inward facing side 36. The outward facing side 34 faces in the axial direction D2 parallel to the rotational center axis A1. The inward facing side 36 faces in the axial direction D2. The inward facing side 36 is opposite to the outward facing side 34 in the axial direction D2. In this embodiment, the outward facing side 34 faces in the outward axial direction D21. The inward facing side 36 faces in the inward axial direction D22.

The bicycle sprocket S2 comprises at least one chain-curvature limiting protuberance 38. The at least one chain-curvature limiting protuberance 38 is configured to limit axial curvature of the bicycle chain C engaging with an independent neighboring bicycle sprocket S3 which is adjacent to the bicycle sprocket S2 without another sprocket between the bicycle sprocket S2 and the independent neighboring bicycle sprocket S3. In this embodiment, as seen in FIG. 7, the bicycle sprocket S2 comprises a plurality of chain-curvature limiting protuberances 38 configured to limit the axial curvature of the bicycle chain C engaging with the independent neighboring bicycle sprocket S3.

As seen in FIG. 7, the at least one chain-curvature limiting protuberance 38 is intermittently disposed on at least one of the outward facing side 34 and the inward facing side 36 in the circumferential direction D1 with respect to the rotational center axis A1. In this embodiment, the chain-curvature limiting protuberances 38 are intermittently disposed on the outward facing side 34 in the circumferential direction D1 with respect to the rotational center axis A1. Accordingly, the bicycle sprocket S2 can be designed to have a shifting facilitation area on which the at least one chain-curvature limiting protuberance is not disposed.

The plurality of sprocket teeth 32 include recessed teeth 39 configured to facilitate shifting the bicycle chain C. The recessed teeth 39 is configured to facilitate upshifting from the bicycle sprocket S2 to the bicycle sprocket S3 and/or is configured to facilitate downshifting from the bicycle sprocket S3 to the bicycle sprocket S2. The recessed teeth 39 are disposed between the chain-curvature limiting protuberances 38 and form a shifting facilitation area on which the chain-curvature limiting protuberance 38 is not disposed.

As seen in FIG. 9, the at least one chain-curvature limiting protuberance 38 is disposed on at least one of the outward facing side 34 and the inward facing side 36. In this embodiment, the at least one chain-curvature limiting protuberance 38 is disposed on the outward facing side 34. However, the at least one chain-curvature limiting protuberance 38 can be disposed on the inward facing side 36. The chain-curvature limiting protuberances 38 are contactable with outer surfaces of the outer link plates of the bicycle chain C in a state where the bicycle chain C is engaged with the bicycle sprocket S3.

The bicycle sprocket S2 further comprises at least one independent chain-curvature limiting protuberance 40 configured to limit the axial curvature of the bicycle chain C engaging with the bicycle sprocket S2. In this embodiment, the bicycle sprocket S2 further comprises independent chain-curvature limiting protuberances 40 configured to limit the axial curvature of the bicycle chain C engaging with the bicycle sprocket S2.

The at least one independent chain-curvature limiting protuberance 40 is disposed on at least one of the outward facing side 34 and the inward facing side 36. In this embodiment, the at least one independent chain-curvature limiting protuberance 40 is disposed on the inward facing side 36. Specifically, the independent chain-curvature limiting protuberances 40 are disposed on the inward facing side 36. However, the at least one independent chain-curvature limiting protuberance 40 can be disposed on the outward facing side 34 or both of the outward facing side 34 and the inward facing side 36.

The at least one independent chain-curvature limiting protuberance 40 is disposed radially outwardly of the at least one chain-curvature limiting protuberance 38. In this embodiment, the independent chain-curvature limiting protuberances 40 are disposed radially outwardly of the at least one chain-curvature limiting protuberance 38.

As seen in FIG. 9, an axial thickness T21 of the at least one chain-curvature limiting protuberance 38 is in a range of 0.10 mm to 0.15 mm. The axial thickness T21 of the at least one chain-curvature limiting protuberance 38 is 0.14 mm. However, the axial thickness T21 of the at least one chain-curvature limiting protuberance 38 can be in a range of approximately 0.10 mm to approximately 0.15 mm. The axial thickness T21 of the at least one chain-curvature limiting protuberance 38 can be approximately 0.14 mm.

An axial thickness T22 of the at least one independent chain-curvature limiting protuberance 40 is in a range of 0.20 mm to 0.30 mm. The axial thickness T22 of the at least one independent chain-curvature limiting protuberance 40 is 0.25 mm. However, the axial thickness T22 of the at least one independent chain-curvature limiting protuberance 40 can be in a range of approximately 0.20 mm to approximately 0.30 mm. The axial thickness T22 of the at least one independent chain-curvature limiting protuberance 40 can be approximately 0.25 mm.

The axial thickness T21 of the at least one chain-curvature limiting protuberance 38 is smaller than the axial thickness T22 of the at least one independent chain-curvature limiting protuberance 40. However, the axial thickness T21 of the at least one chain-curvature limiting protuberance 38 can be equal to or larger than the axial thickness T22 of the at least one of independent chain-curvature limiting protuberances 40.

Figure 10:
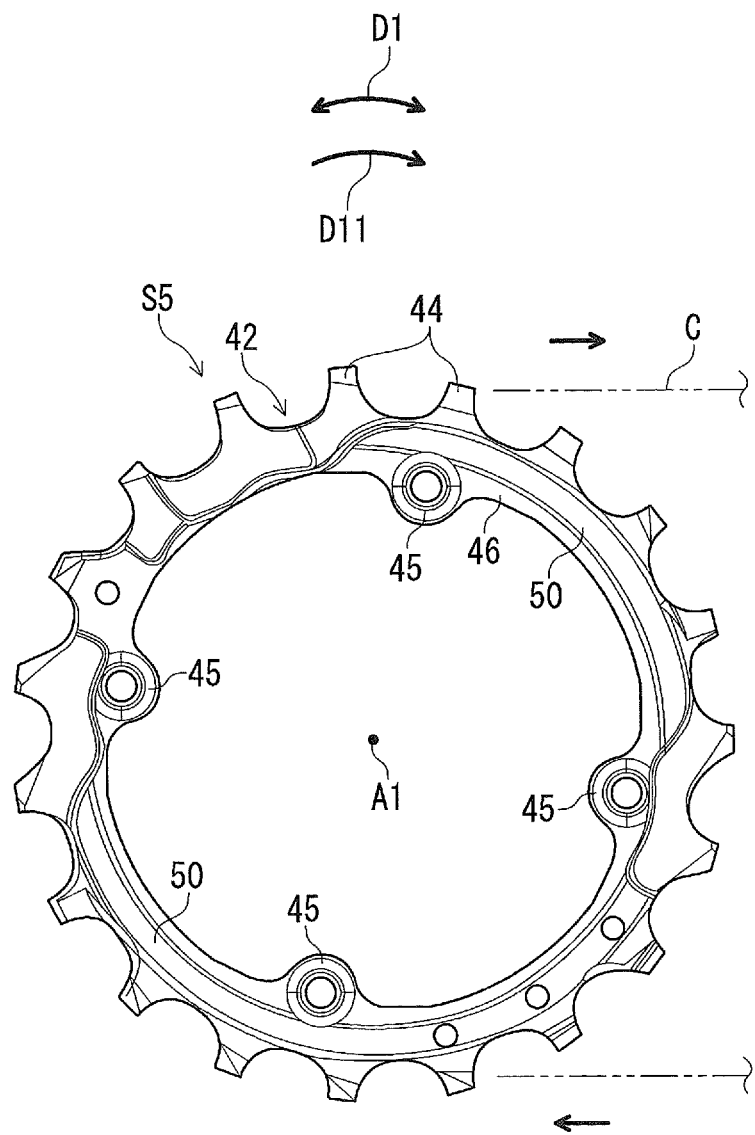
FIG. 10 is a right side elevational view of a bicycle sprocket of the bicycle multiple sprocket assembly.
Figure 11:
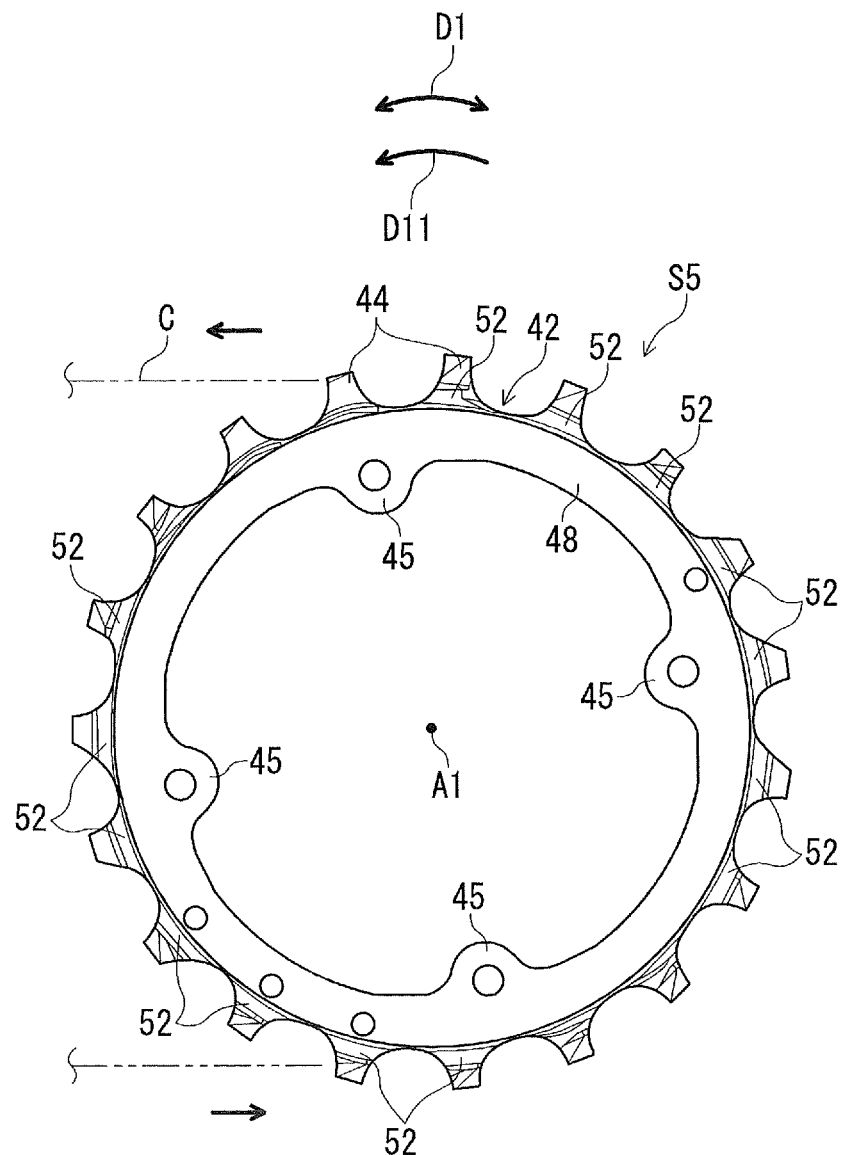
FIG. 11 is a left side elevational view of the bicycle sprocket illustrated in FIG. 10.
Figure 12:
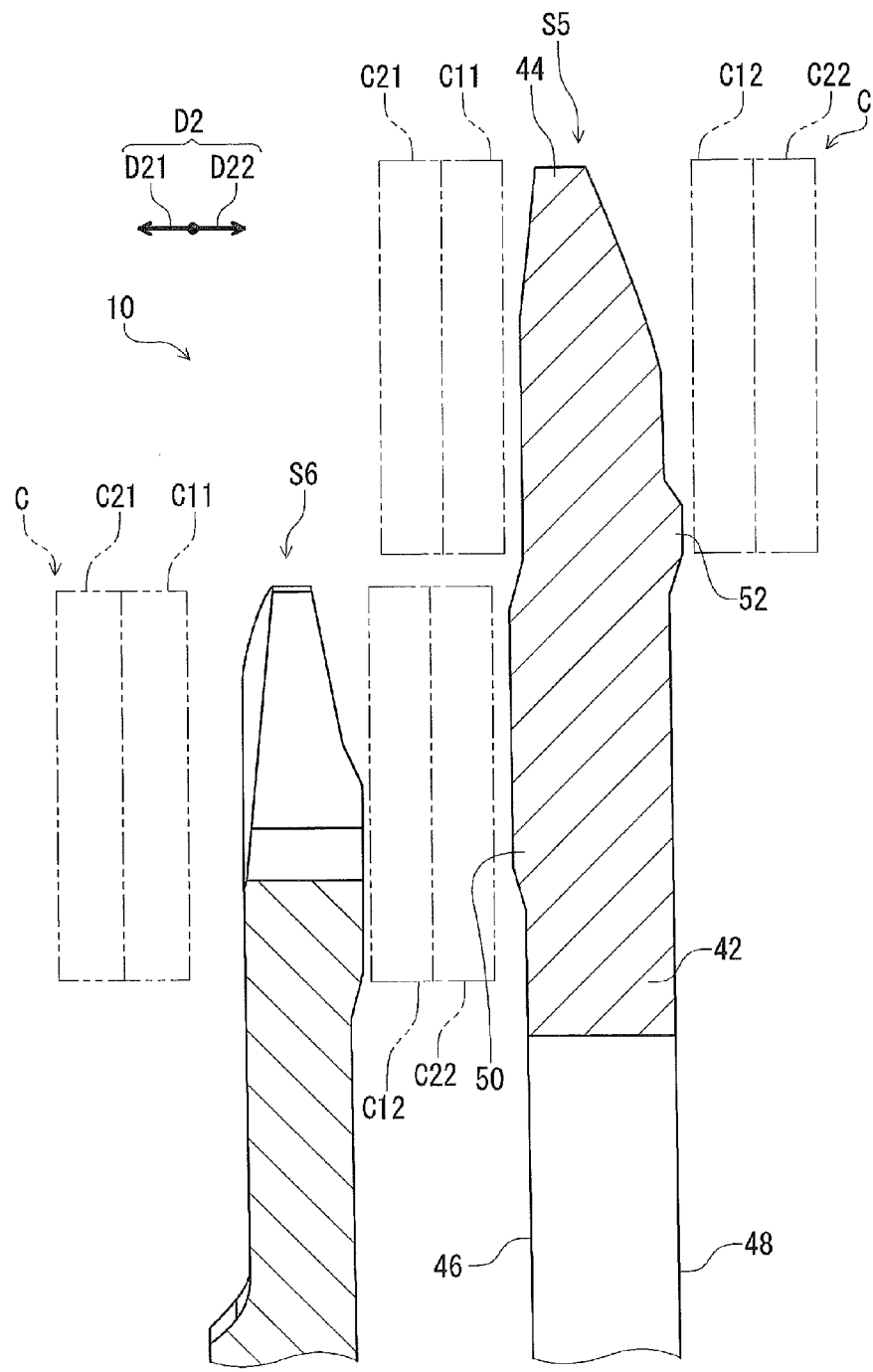
FIG. 12 is a partial cross-sectional view of the bicycle sprocket illustrated in FIG. 10 and another bicycle sprocket.

As seen in FIGS. 10 and 11, the bicycle sprocket S5 comprises a sprocket body 42 and a plurality of sprocket teeth 44. The bicycle sprocket S5 includes securing parts 45. As seen in FIG. 12, the bicycle sprocket S5 has an outward facing side 46 and an inward facing side 48. The bicycle sprocket S5 comprises at least one chain-curvature limiting protuberance 50 and at least one independent chain-curvature limiting protuberance 52. In this embodiment, the bicycle sprocket S5 comprises a plurality of chain-curvature limiting protuberances 50 and a plurality of independent chain-curvature limiting protuberances 52.

The bicycle sprocket S5 has substantially the same structure as the structure of the bicycle sprocket S1. The sprocket body 42, the sprocket teeth 44, the securing parts 45, the outward facing side 46, the inward facing side 48, the chain-curvature limiting protuberances 50, and the independent chain-curvature limiting protuberances 52 respectively correspond to the sprocket body 30, the sprocket teeth 32, the securing parts 33, the outward facing side 34, the inward facing side 36, the chain-curvature limiting protuberances 38, and the independent chain-curvature limiting protuberances 40 of the bicycle sprocket S2. Thus, they will not be described in detail here for the sake of brevity.

Similarly, the bicycle sprockets S3 and S4 have substantially the same structure as the structure of the bicycle sprocket S2. Thus, they will not be described in detail here for the sake of brevity.

Figure 13:
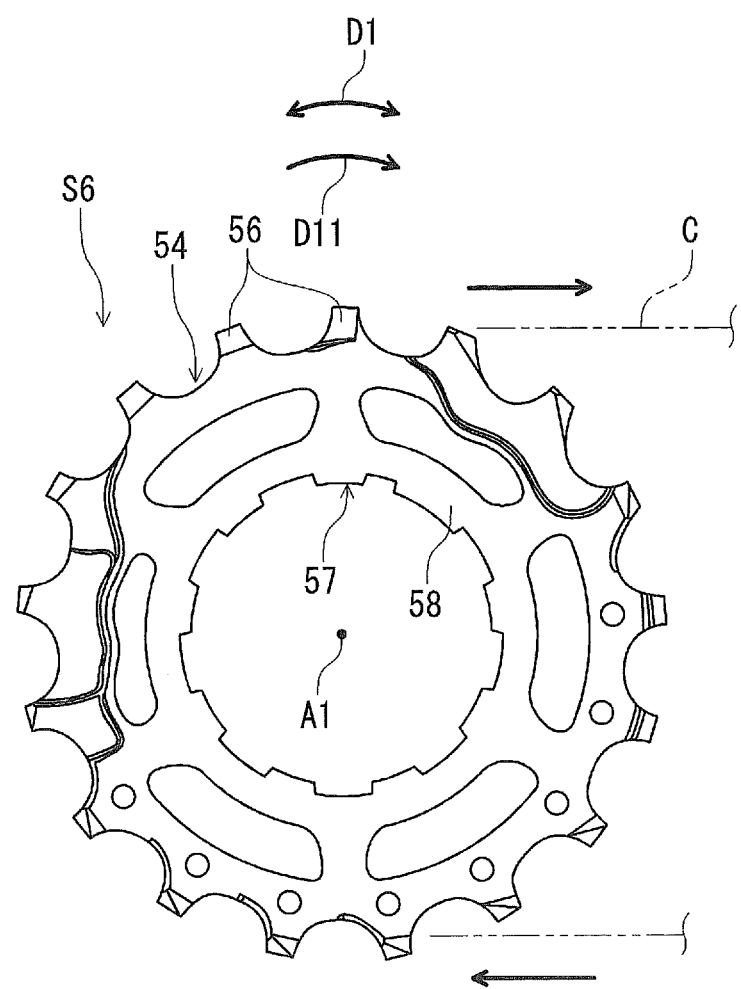
FIG. 13 is a right side elevational view of a bicycle sprocket of the bicycle multiple sprocket assembly.
Figure 14:
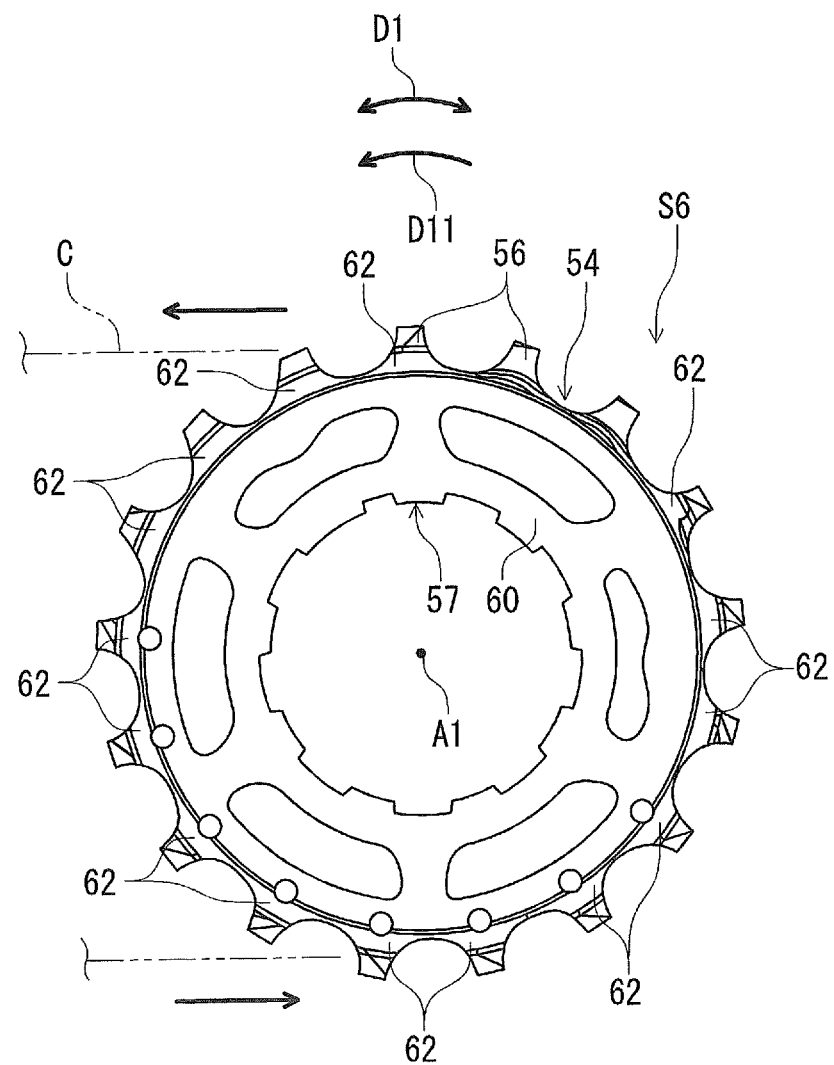
FIG. 14 is a left side elevational view of the bicycle sprocket illustrated in FIG. 13.

As seen in FIGS. 13 and 14, the bicycle sprocket S6 has the rotational center axis A1. The bicycle sprocket S6 is configured to be rotatable about the rotational center axis A1. The bicycle sprocket S6 comprises a sprocket body 54 and a plurality of sprocket teeth 56. The sprocket body 54 is configured to be rotatable about the rotational center axis A1. The plurality of sprocket teeth 56 extend radially outward from an outer periphery of the sprocket body 54.

The sprocket body 54 has an annular shape. The bicycle sprocket S6 includes a hub engagement part 57 configured to be engaged with the bicycle hub assembly 2 (FIG. 2). The hub engagement part 57 is provided on an inner periphery of the sprocket body 54.

Figure 15:
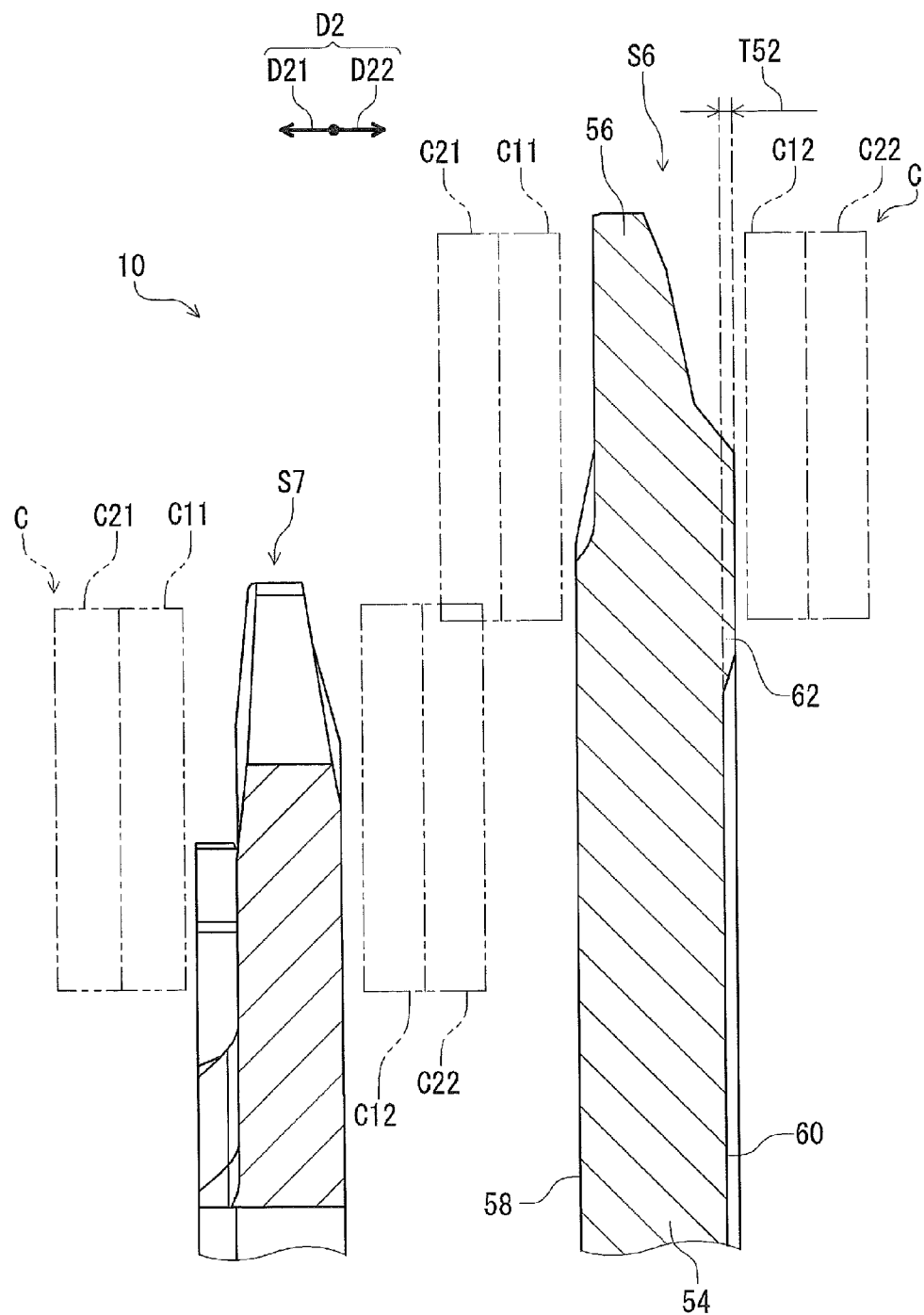
FIG. 15 is a partial cross-sectional view of the bicycle sprocket illustrated in FIG. 13 and another bicycle sprocket.

As seen in FIG. 15, the bicycle sprocket S6 has an outward facing side 58 and an inward facing side 60. The outward facing side 58 faces in the axial direction D2 parallel to the rotational center axis A1. The inward facing side 60 faces in the axial direction D2. The inward facing side 60 is opposite to the outward facing side 58 in the axial direction D2. In this embodiment, the outward facing side 58 faces in the outward axial direction D21. The inward facing side 60 faces in the inward axial direction D22.

Unlike the bicycle sprocket S2, the second sprocket S6 is free from a chain-curvature limiting protuberance configured to limit the axial curvature of the bicycle chain C engaging with at least one of the first sprocket S5 and the third sprocket S7. However, the bicycle sprocket S6 can comprise at least one chain-curvature limiting protuberance configured to limit axial curvature of the bicycle chain C engaging with an independent neighboring bicycle sprocket S7 which is adjacent to the bicycle sprocket S6 without another sprocket between the bicycle sprocket S6 and the independent neighboring bicycle sprocket S7.

The bicycle sprocket S6 further comprises at least one independent chain-curvature limiting protuberance 62. The at least one independent chain-curvature limiting protuberance 62 is configured to limit the axial curvature of the bicycle chain C engaging with the bicycle sprocket S6. In this embodiment, the bicycle sprocket S6 further comprises independent chain-curvature limiting protuberances 62 configured to limit the axial curvature of the bicycle chain C engaging with the bicycle sprocket S6.

The at least one independent chain-curvature limiting protuberance 62 is disposed on at least one of the outward facing side 58 and the inward facing side 60. In this embodiment, the at least one independent chain-curvature limiting protuberance 62 is disposed on the inward facing side 60. The independent chain-curvature limiting protuberances 62 are disposed on the inward facing side 60. However, the at least one independent chain-curvature limiting protuberance 62 can be disposed on the outward facing side 58 or both of the outward facing side 58 and the inward facing side 60.

As seen in FIG. 15, an axial thickness T52 of the at least one independent chain-curvature limiting protuberance 62 is in a range of 0.20 mm to 0.30 mm. The axial thickness T52 of the at least one independent chain-curvature limiting protuberance 62 is 0.25 mm. However, the axial thickness T52 of the at least one independent chain-curvature limiting protuberance 62 can be in a range of approximately 0.20 mm to approximately 0.30 mm. The axial thickness T52 of the at least one independent chain-curvature limiting protuberance 62 can be approximately 0.25 mm.

In a case where the bicycle sprockets S5 and S6 can also be respectively referred to as a first sprocket S5 and a second sprocket S6, the sprocket bodies 42 and 54 can also be respectively referred to as a first sprocket body 42 and a second sprocket body 54. The plurality of sprocket teeth 44 and 56 can also be respectively referred to as a plurality of first sprocket teeth 44 and a plurality of second sprocket teeth 56. The at least one chain-curvature limiting protuberance 50 and the at least one independent chain-curvature limiting protuberance 52 can also be respectively referred to as at least one first chain-curvature limiting protuberance 50 and at least one first independent chain-curvature limiting protuberance 52.

In this case, as seen in FIGS. 10 and 13, a total number of the plurality of second sprocket teeth 56 is less than a total number of the plurality of first sprocket teeth 44 by two or more (the condition CD1). Specifically, the total number of the plurality of first sprocket teeth 44 is nineteen. The total number of the plurality of second sprocket teeth 56 is seventeen. Furthermore, as seen in FIG. 12, the at least one first chain-curvature limiting protuberance 50 is configured to limit the axial curvature of the bicycle chain C engaging with the second sprocket S6. The at least one first independent chain-curvature limiting protuberance 52 is configured to limit the axial curvature of the bicycle chain C engaging with the first sprocket S5. If the condition CD1 is satisfied, other bicycle sprockets can be referred to as the first sprocket and the second sprocket.

Figure 16:
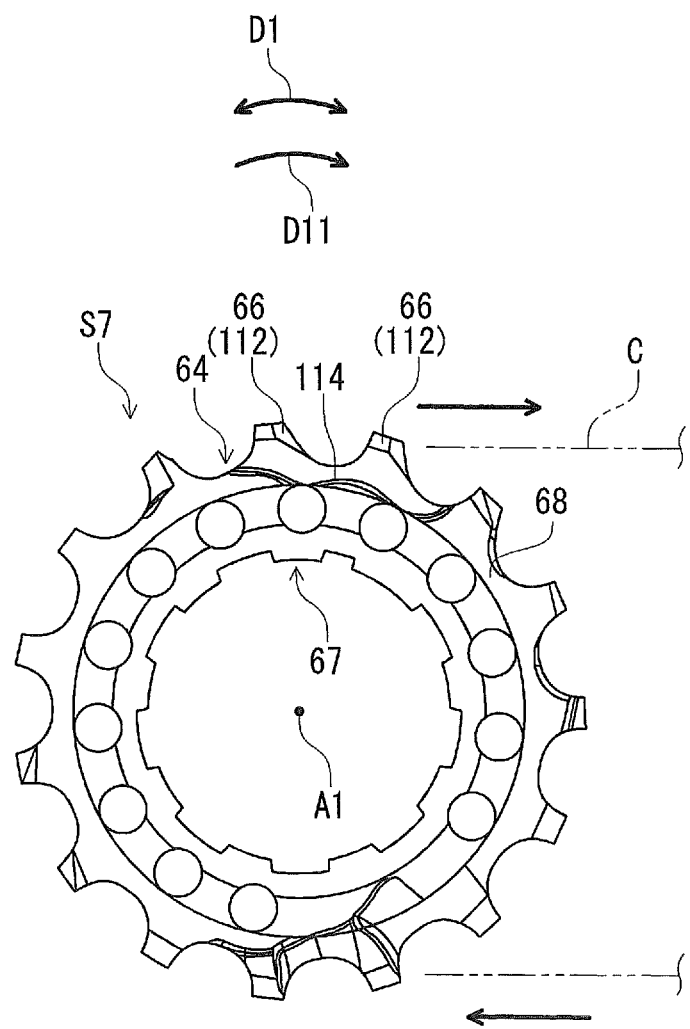
FIG. 16 is a right side elevational view of a bicycle sprocket of the bicycle multiple sprocket assembly.
Figure 17:
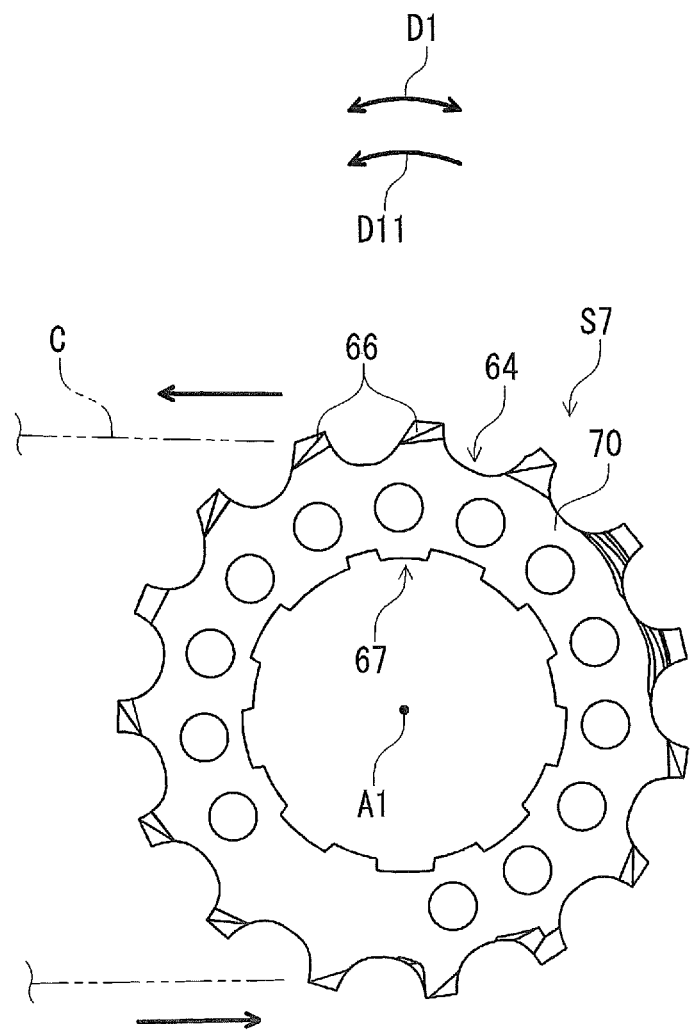
FIG. 17 is a left side elevational view of the bicycle sprocket illustrated in FIG. 16.

As seen in FIGS. 16 and 17, the bicycle sprocket S7 has the rotational center axis A1. The bicycle sprocket S7 is configured to be rotatable about the rotational center axis A1. The bicycle sprocket S7 comprises a sprocket body 64 and a plurality of sprocket teeth 66. The sprocket body 64 is configured to be rotatable about the rotational center axis A1. The plurality of sprocket teeth 66 extend radially outward from an outer periphery of the sprocket body 64.

The sprocket body 64 has an annular shape. The bicycle sprocket S7 includes a hub engagement part 67 configured to be engaged with the bicycle hub assembly 2 (FIG. 2). The hub engagement part 67 is provided on an inner periphery of the sprocket body 64.

Figure 18:
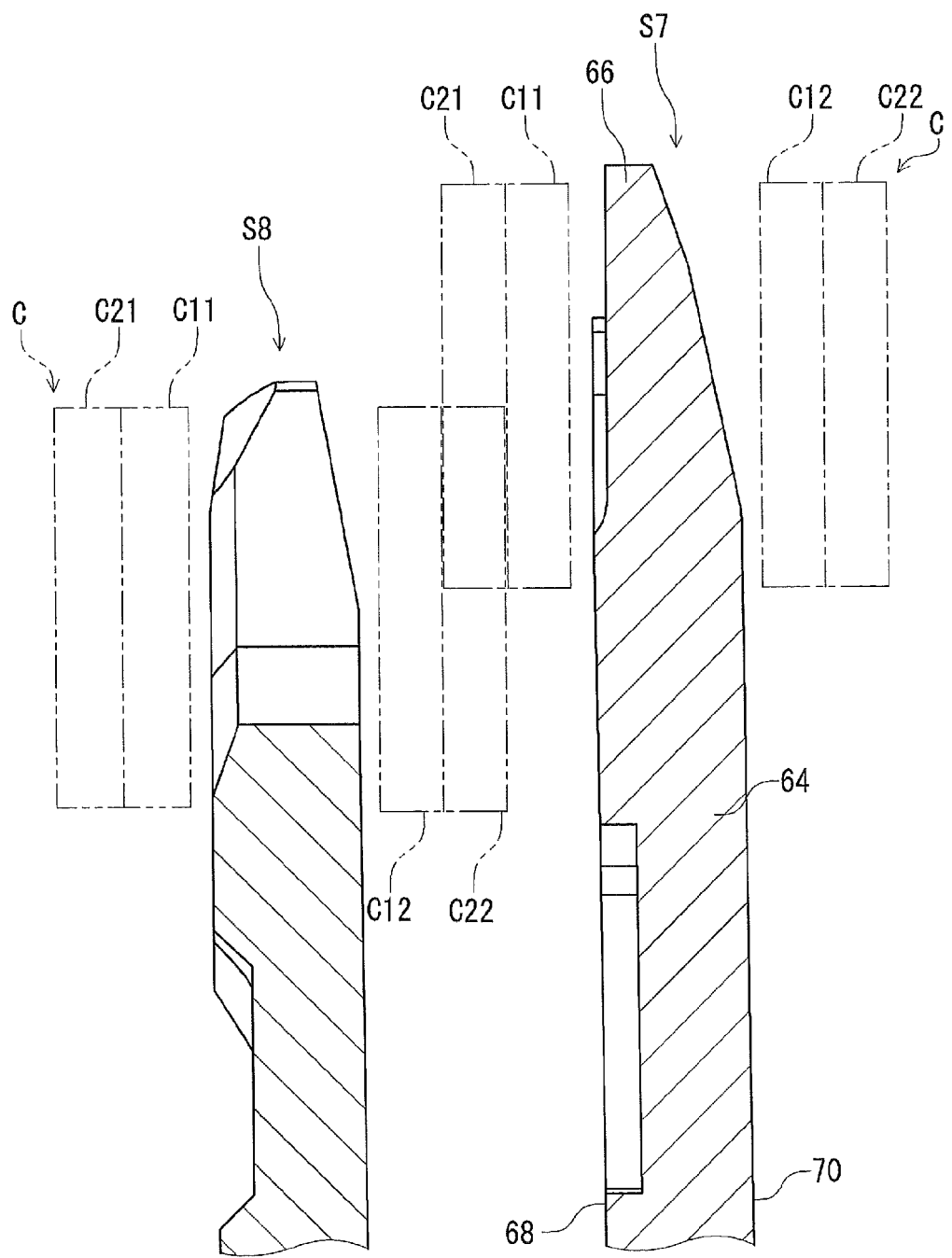
FIG. 18 is a partial cross-sectional view of the bicycle sprocket illustrated in FIG. 16 and another bicycle sprocket.

As seen in FIG. 18, the bicycle sprocket S7 has an outward facing side 68 and an inward facing side 70. The outward facing side 68 faces in the axial direction D2 parallel to the rotational center axis A1. The inward facing side 70 faces in the axial direction D2. The inward facing side 70 is opposite to the outward facing side 68 in the axial direction D2. In this embodiment, the outward facing side 68 faces in the outward axial direction D21. The inward facing side 70 faces in the inward axial direction D22.

Unlike the bicycle sprocket S2, the third sprocket S7 is free from a chain-curvature limiting protuberance configured to limit the axial curvature of the bicycle chain C engaging with at least one of the second sprocket S6 and the fourth sprocket S8. However, the bicycle sprocket S7 can comprise at least one chain-curvature limiting protuberance configured to limit axial curvature of the bicycle chain C engaging with an independent neighboring bicycle sprocket S8 which is adjacent to the bicycle sprocket S7 without another sprocket between the bicycle sprocket S7 and the independent neighboring bicycle sprocket S8. The bicycle sprocket S7 can comprise at least one independent chain-curvature limiting protuberance configured to limit the axial curvature of the bicycle chain C engaging with the bicycle sprocket S7.

In a case where the bicycle sprockets S5, S6, and S7 can also be respectively referred to as the first sprocket S5, the second sprocket S6, and a third sprocket S7, the sprocket body 64 can also be referred to as a third sprocket body 64. The plurality of sprocket teeth 66 can also be referred to as a plurality of third sprocket teeth 66. The at least one chain-curvature limiting protuberance 62 can also be referred to as at least one second independent chain-curvature limiting protuberance 62.

In this case, as seen in FIGS. 13 and 16, a total number of the plurality of third sprocket teeth 66 is less than the total number of the plurality of second sprocket teeth 56 by two or more (a condition CD2). Specifically, the total number of the plurality of second sprocket teeth 56 is seventeen. The total number of the plurality of third sprocket teeth 66 is fifteen. Furthermore, as seen in FIG. 15, the at least one second independent chain-curvature limiting protuberance 62 is configured to limit the axial curvature of the bicycle chain C engaging with the second sprocket S6. The second sprocket S6 is free from a chain-curvature limiting protuberance configured to limit the axial curvature of the bicycle chain C engaging with at least one of the first sprocket S5 and the third sprocket S7. If the conditions CD1 and CD2 are satisfied, other bicycle sprockets can be referred to as the first sprocket, the second sprocket, and the third sprocket.

Figure 19:
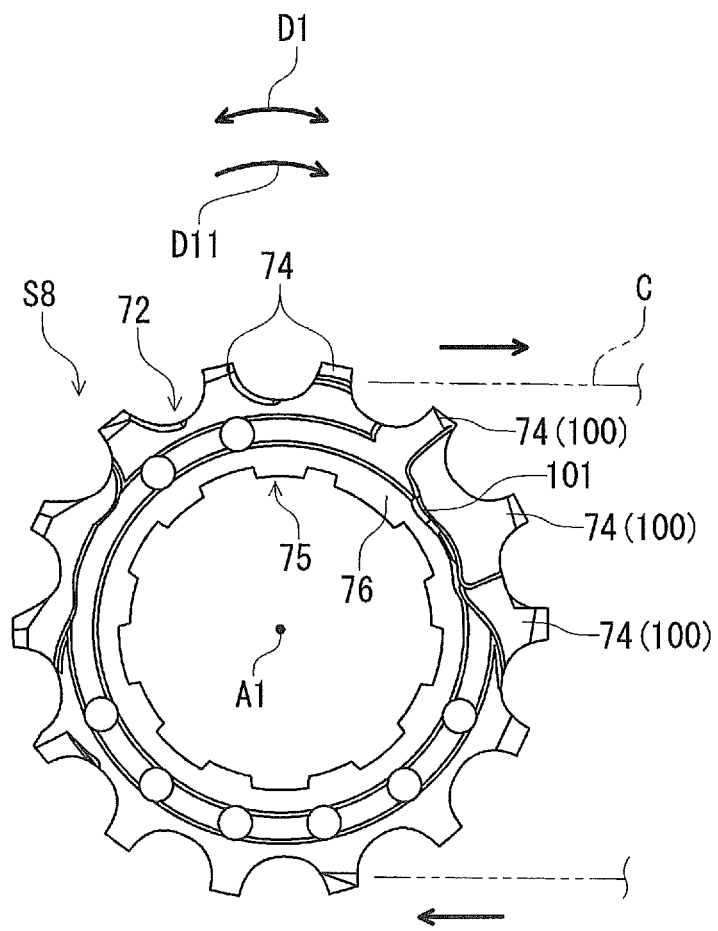
FIG. 19 is a right side elevational view of a bicycle sprocket of the bicycle multiple sprocket assembly.
Figure 20:
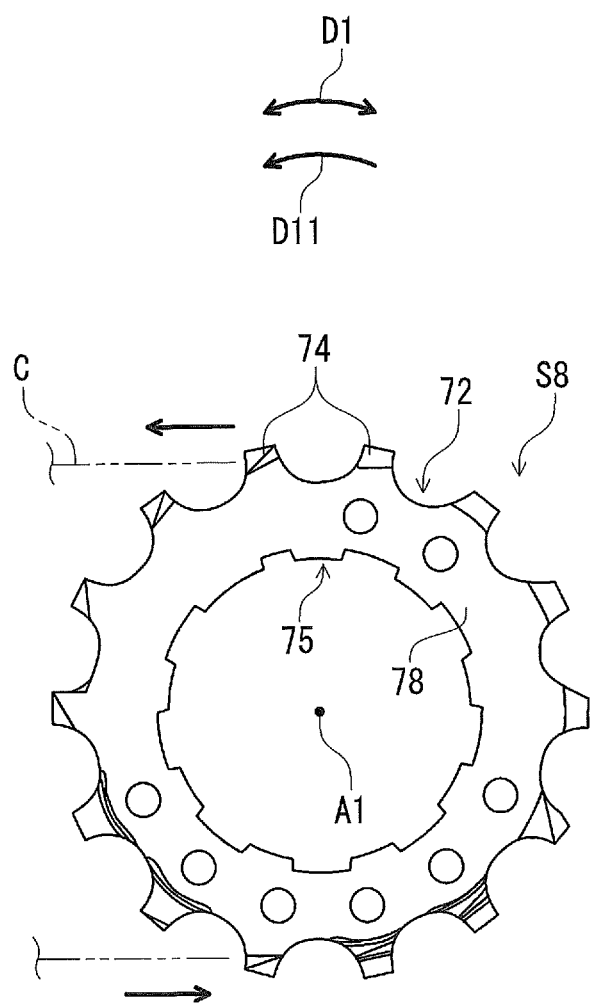
FIG. 20 is a left side elevational view of the bicycle sprocket illustrated in FIG. 19.

As seen in FIGS. 19 and 20, the bicycle sprocket S8 comprises a sprocket body 72 and a plurality of sprocket teeth 74. The bicycle sprocket S8 includes a hub engagement part 75. The bicycle sprocket S8 has an outward facing side 76 and an inward facing side 78.

The bicycle sprocket S8 has substantially the same structure as the structure of the bicycle sprocket S7. The sprocket body 72, the sprocket teeth 74, the securing parts 75, the outward facing side 76, and the inward facing side 78 respectively correspond to the sprocket body 54, the sprocket teeth 56, the hub engagement part 57, the outward facing side 58, and the inward facing side 60 of the bicycle sprocket S6. Thus, they will not be described in detail here for the sake of brevity.

In a case where the bicycle sprockets S5, S6, S7, and S8 can also be respectively referred to as the first sprocket S5, the second sprocket S6, the third sprocket S7, and a fourth sprocket S8, the sprocket body 72 can also be referred to as a fourth sprocket body 72. The plurality of sprocket teeth 74 can also be referred to as a plurality of fourth sprocket teeth 74.

In this case, as seen in FIGS. 16 and 19, a total number of the plurality of fourth sprocket teeth 74 is less than the total number of the plurality of third sprocket teeth 66 by one (a condition CD3). Specifically, the total number of the plurality of third sprocket teeth 66 is fifteen. The total number of the plurality of fourth sprocket teeth 74 is fourteen. Furthermore, as seen in FIG. 18, the third sprocket S7 is free from a chain-curvature limiting protuberance configured to limit the axial curvature of the bicycle chain C engaging with at least one of the second sprocket S6 and the fourth sprocket S8. If the conditions CD1, CD2, and CD3 are satisfied, other bicycle sprockets can be referred to as the first sprocket, the second sprocket, the third sprocket, and the fourth sprocket.

Figure 21:
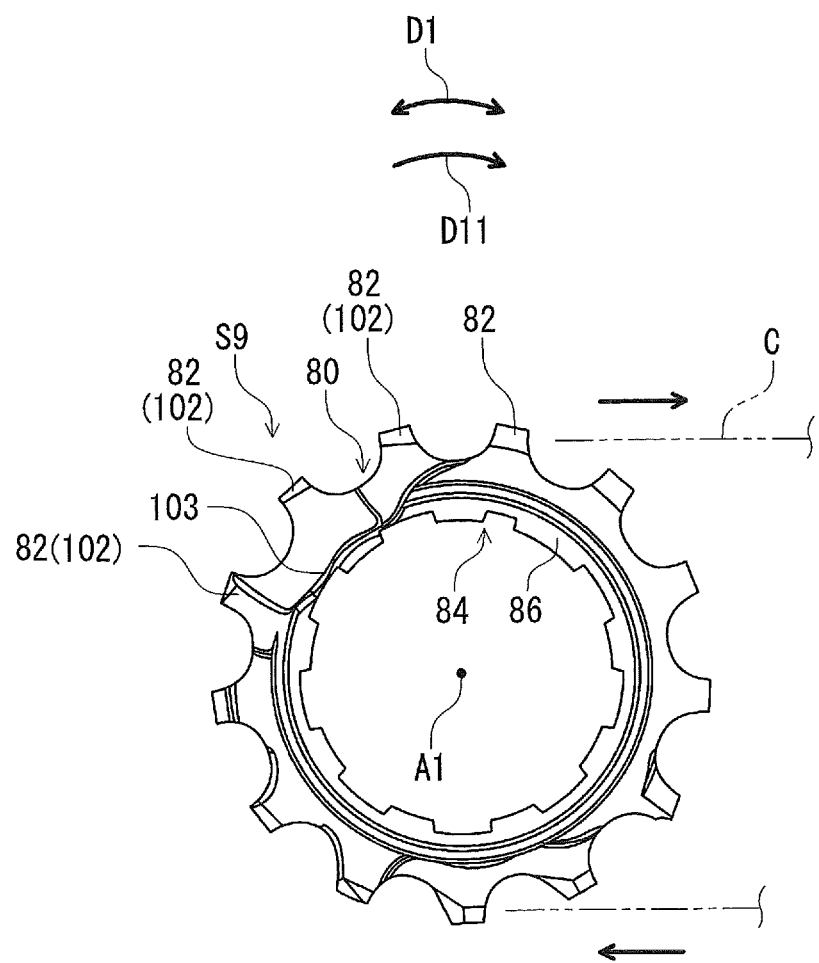
FIG. 21 is a right side elevational view of a bicycle sprocket of the bicycle multiple sprocket assembly.
Figure 22:
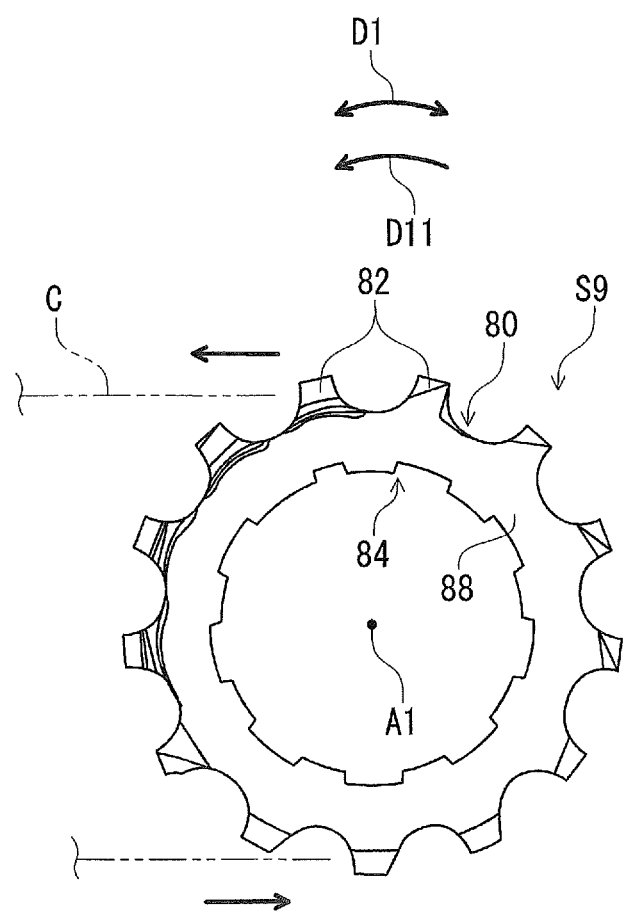
FIG. 22 is a left side elevational view of the bicycle sprocket illustrated in FIG. 21.

As seen in FIGS. 21 and 22, the bicycle sprocket S9 comprises a sprocket body 80 and a plurality of sprocket teeth 82. The bicycle sprocket S9 includes a hub engagement part 84. The bicycle sprocket S9 has an outward facing side 86 and an inward facing side 88.

The bicycle sprocket S9 has substantially the same structure as the structure of the bicycle sprocket S7. The sprocket body 80, the sprocket teeth 82, the hub engagement part 84, the outward facing side 86, and the inward facing side 88 respectively correspond to the sprocket body 54, the sprocket teeth 56, the hub engagement part 57, the outward facing side 58, and the inward facing side 60 of the bicycle sprocket S6. Thus, they will not be described in detail here for the sake of brevity.

Figure 23:
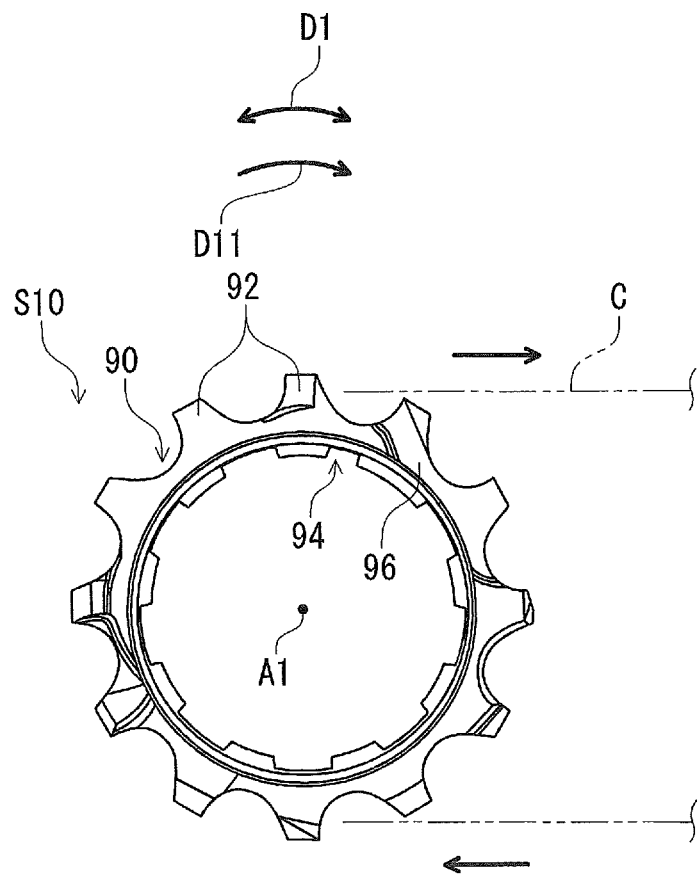
FIG. 23 is a right side elevational view of a bicycle sprocket of the bicycle multiple sprocket assembly.
Figure 24:
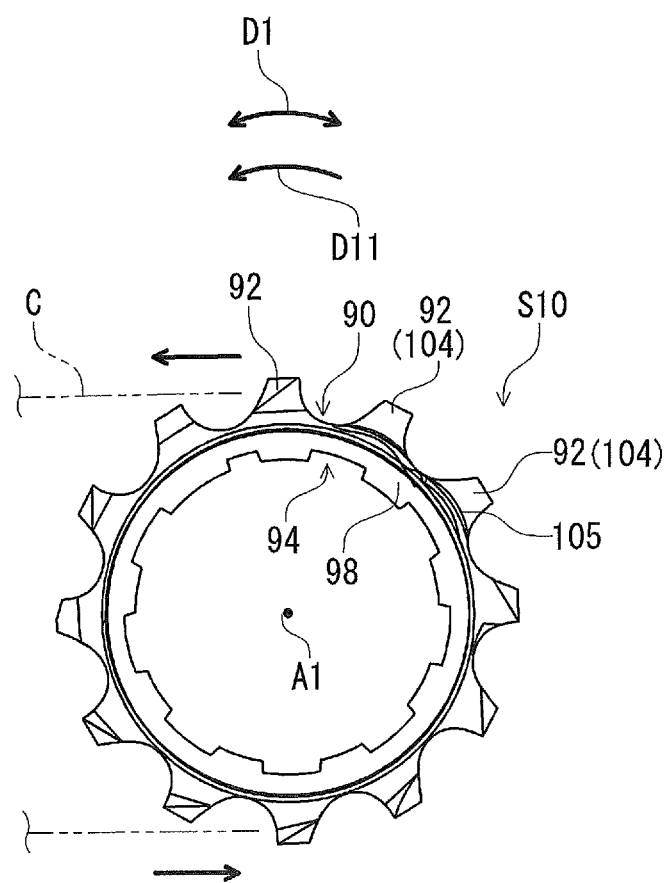
FIG. 24 is a left side elevational view of the bicycle sprocket illustrated in FIG. 23.

As seen in FIGS. 23 and 24, the bicycle sprocket S10 comprises a sprocket body 90 and a plurality of sprocket teeth 92. The bicycle sprocket S10 includes a hub engagement part 94. The bicycle sprocket S10 has an outward facing side 96 and an inward facing side 98.

The bicycle sprocket S10 has substantially the same structure as the structure of the bicycle sprocket S7. The sprocket body 90, the sprocket teeth 92, the hub engagement part 94, the outward facing side 96, and the inward facing side 98 respectively correspond to the sprocket body 54, the sprocket teeth 56, the hub engagement part 57, the outward facing side 58, and the inward facing side 60 of the bicycle sprocket S6. Thus, they will not be described in detail here for the sake of brevity.

The bicycle sprocket S11 has substantially the same structure as the structure of the bicycle sprocket S7. Thus, they will not be described in detail here for the sake of brevity.

In a case where the bicycle sprockets S8, S9, and S10 can also be respectively referred to as a first sprocket element S8, a second sprocket element S9, and a third sprocket element S10, the sprocket bodies 72, 80, and 90 can also be respectively referred to as a first body 72, a second body 80, and a third body 90. The plurality of sprocket teeth 74, 82, and 92 can also be respectively referred to as a plurality of first teeth 74, a plurality of second teeth 82, and a plurality of third teeth 92.

As seen in FIGS. 19 and 21, a total number of the plurality of second teeth 82 is less than a total number of the plurality of first teeth 74 (a condition CD4). Specifically, the total number of the plurality of first teeth 74 is fourteen, and the total number of the plurality of second teeth 82 is thirteen. As seen in FIGS. 22 and 24, a total number of the plurality of third teeth 92 is less than the total number of the plurality of second teeth 82 (a condition CD5). Specifically, the total number of the plurality of third teeth 92 is twelve. If the conditions CD4 and CD5 are satisfied, other bicycle sprockets can be referred to as the first sprocket element, the second sprocket element, and the third sprocket element.

Figure 25:
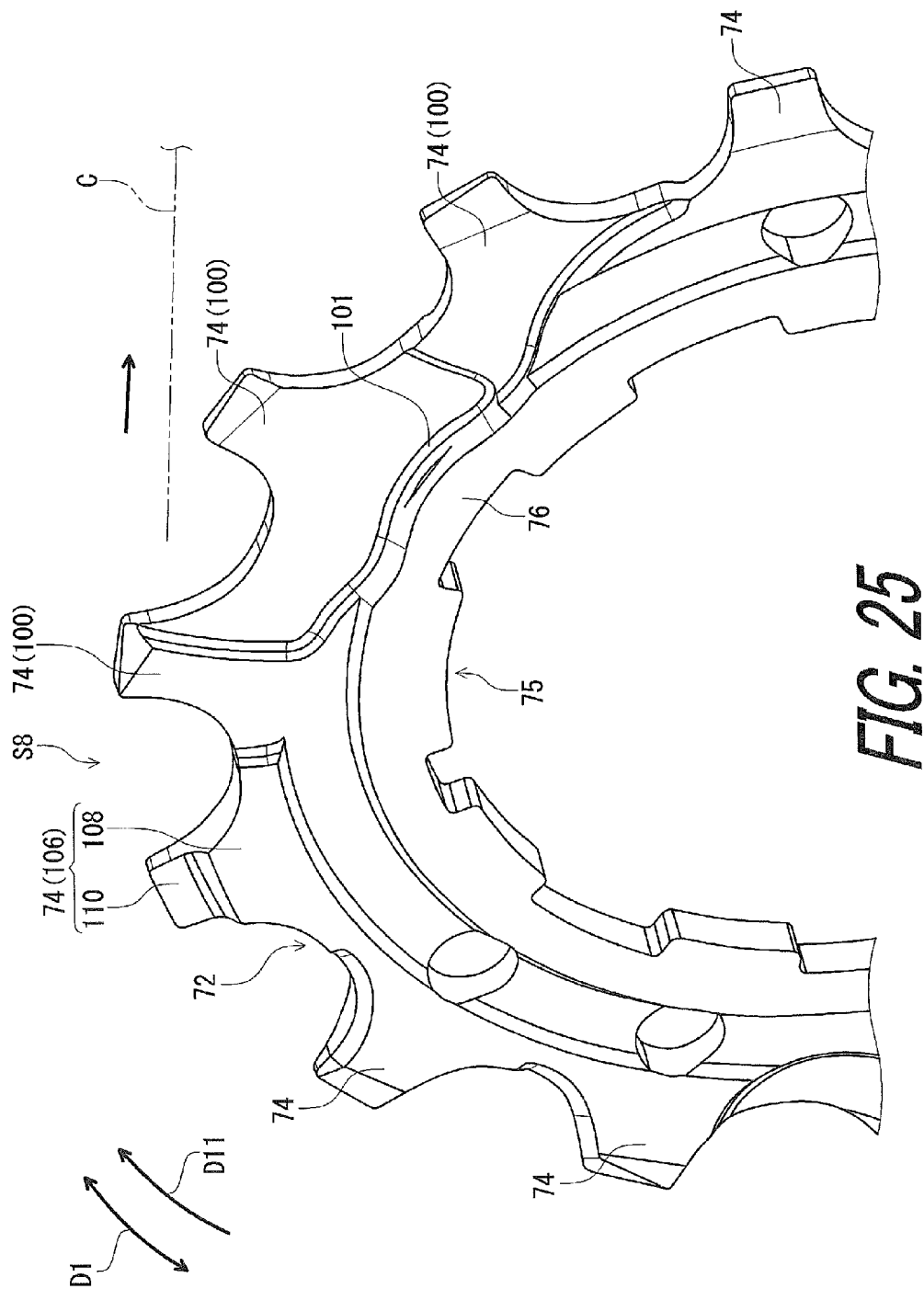
FIG. 25 is a partial perspective view of a bicycle sprocket of the bicycle multiple sprocket assembly.

As seen in FIGS. 19 and 25, the plurality of first teeth 74 include a first recessed tooth 100. In the illustrated embodiment, the plurality of first teeth 74 include first recessed teeth 100. The first recessed tooth 100 is configured to facilitate shifting the bicycle chain C from the first sprocket element S8 to a neighboring sprocket S9 adjacent to the first sprocket element S8 without another sprocket between the first sprocket element S8 and the neighboring sprocket S9. An axial thickness of the first recessed tooth 100 is smaller than an axial thickness of other first teeth 74. The first sprocket element S8 includes a first recess 101 disposed on the outward facing side 76 to provide the first recessed tooth 100.

The first recessed tooth 100 is configured to facilitate upshifting from the first sprocket element S8 e.g. to the second sprocket element S9 adjacent to the first sprocket element S8 without another sprocket between the first sprocket element S8 and the second sprocket element S9. The first recessed tooth 100 may be configured to facilitate downshifting from the first sprocket element S8 to the neighboring sprocket element S7. Further, the first recessed tooth 100 is configured to facilitate shifting the bicycle chain C from the second sprocket element S9 to the third sprocket element S10 adjacent to the second sprocket element S9 without another sprocket between the second sprocket element S9 and the third sprocket element S10.

Figure 26:
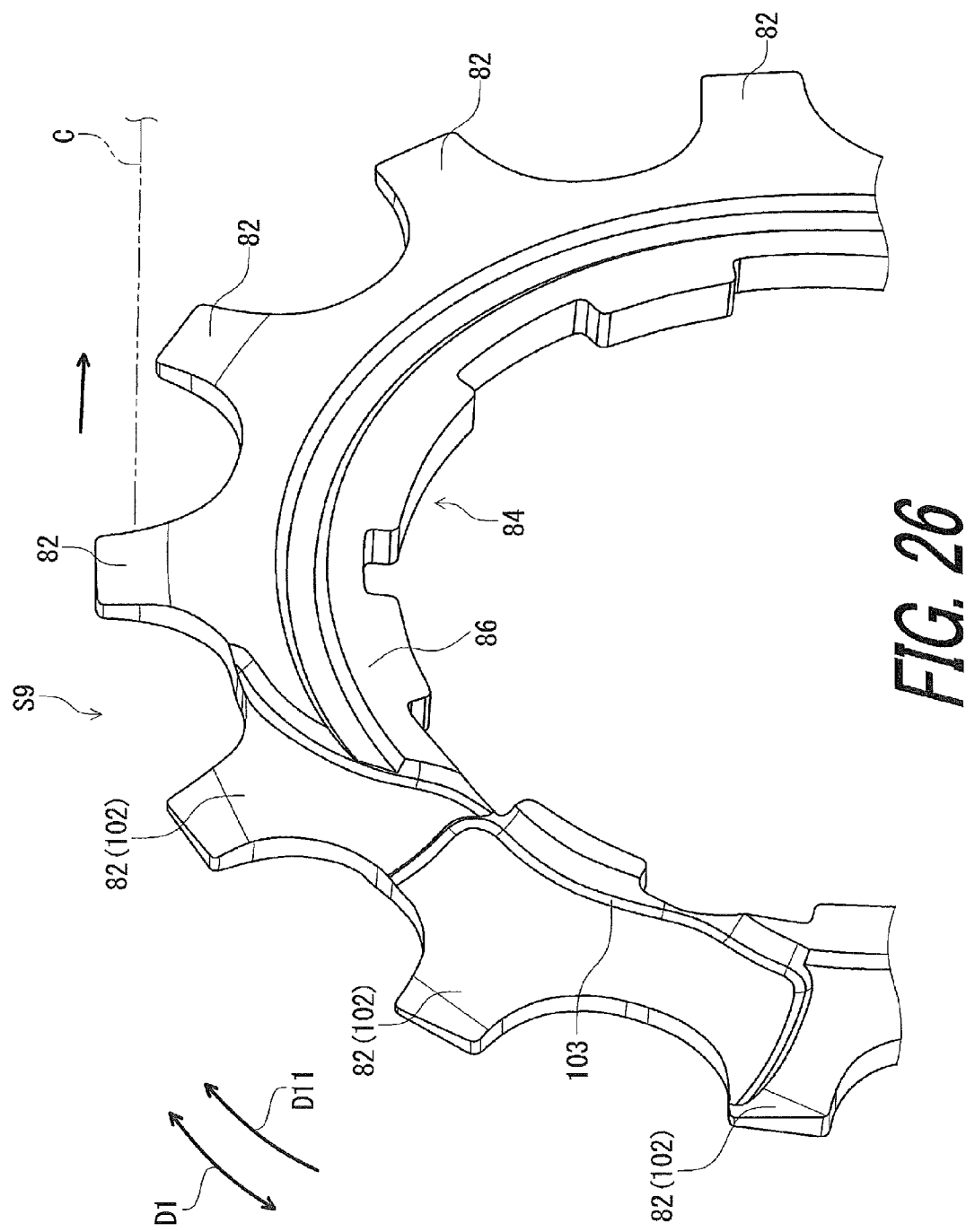
FIG. 26 is a partial perspective view of a bicycle sprocket of the bicycle multiple sprocket assembly.

As seen in FIGS. 21 and 26, the plurality of second teeth 82 include a second recessed tooth 102. In the illustrated embodiment, the plurality of second teeth 82 include second recessed teeth 102. The second recessed tooth 102 is configured to facilitate shifting the bicycle chain C from the second sprocket element S9 to the third sprocket element S10 adjacent to the second sprocket element S9 without another sprocket between the second sprocket element S9 and the third sprocket element S10. The second recessed tooth 102 is configured to facilitate upshifting from the second sprocket element S9. An axial thickness of the second recessed tooth 102 is smaller than an axial thickness of other second teeth 82. The second sprocket element S9 includes a second recess 103 disposed on the outward facing side 86 to provide the second recessed tooth 102.

Figure 27:
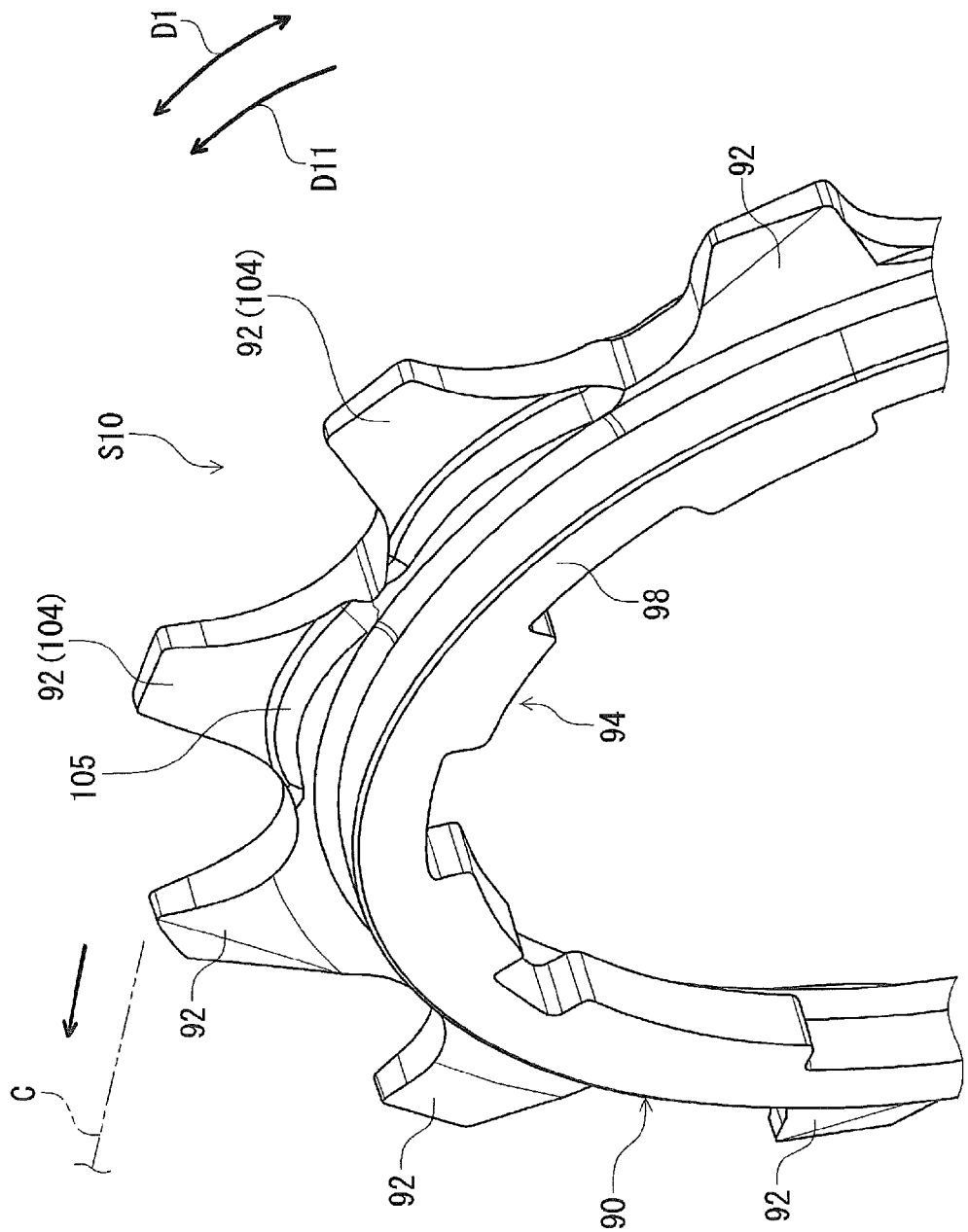
FIG. 27 is a partial perspective view of a bicycle sprocket of the bicycle multiple sprocket assembly.

As seen in FIGS. 24 and 27, the plurality of third teeth 92 include a third recessed tooth 104. In this embodiment, the plurality of third teeth 92 include third recessed teeth 104. The third recessed tooth 104 is configured to facilitate shifting the bicycle chain C from the second sprocket element S9 to the third sprocket element S10. The third recessed tooth 104 faces the second sprocket element S9 in the axial direction D2 parallel to the rotational center axis A1. An axial thickness of the third recessed tooth 104 is smaller than an axial thickness of other third teeth 92. The third sprocket element S10 includes a third recess 105 disposed on the inward facing side 98 to provide the third recessed tooth 104.

Figure 28:
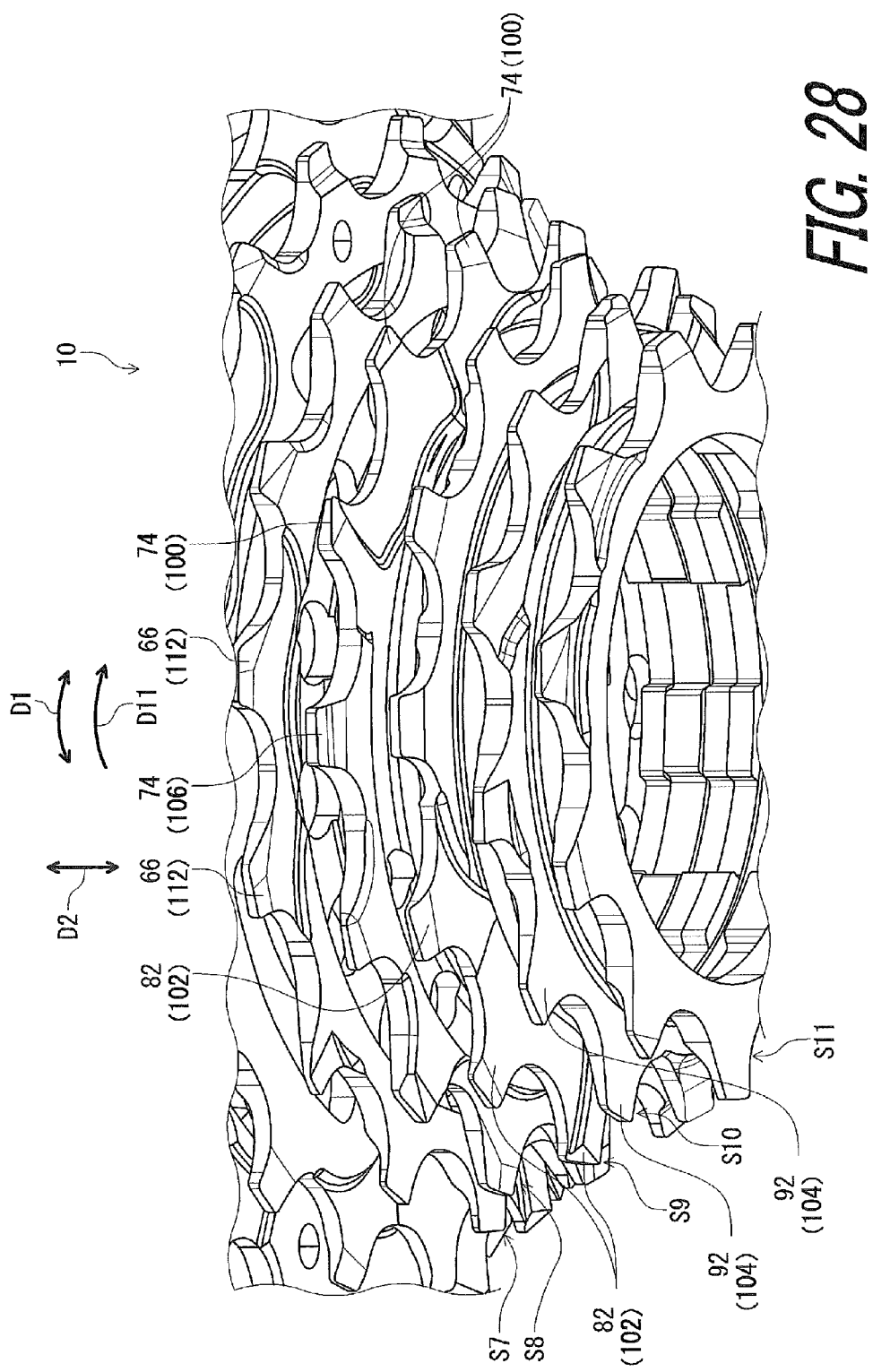
FIG. 28 is a partial perspective view of the bicycle multiple sprocket assembly.

As seen in FIG. 28, the first recessed tooth 100 faces the second sprocket element S9 in the axial direction D2 parallel to the rotational center axis A1. The second recessed tooth 102 faces the third sprocket element S10 in the axial direction D2 parallel to the rotational center axis A1.

The first recessed tooth 100 is provided on a downstream side of the third recessed tooth 104 in the driving rotational direction D11 in which the bicycle multiple sprocket assembly 10 rotates about the rotational center axis A1 during pedaling. In this embodiment, the first recessed tooth 100 is entirely provided on the downstream side of the third recessed tooth 104 in the driving rotational direction D11. However, the first recessed tooth 100 can be partly provided on the downstream side of the third recessed tooth 104 in the driving rotational direction D11.

The first recessed tooth 100 is provided on a downstream side of the second recessed tooth 102 in the driving rotational direction D11 in which the bicycle multiple sprocket assembly 10 rotates about the rotational center axis A1 during pedaling. In this embodiment, the first recessed tooth 100 is entirely provided on the downstream side of the second recessed tooth 102 in the driving rotational direction D11. However, the first recessed tooth 100 can be partly provided on the downstream side of the second recessed tooth 102 in the driving rotational direction D11.

The second recessed tooth 102 is provided on a downstream side of the third recessed tooth 104 in the driving rotational direction D11 in which the bicycle multiple sprocket assembly 10 rotates about the rotational center axis A1 during pedaling. In this embodiment, the second recessed tooth 102 is partly provided on the downstream side of the third recessed tooth 104 in the driving rotational direction D11. However, the second recessed tooth 102 can be entirely provided on the downstream side of the third recessed tooth 104 in the driving rotational direction D11.

Figure 29:
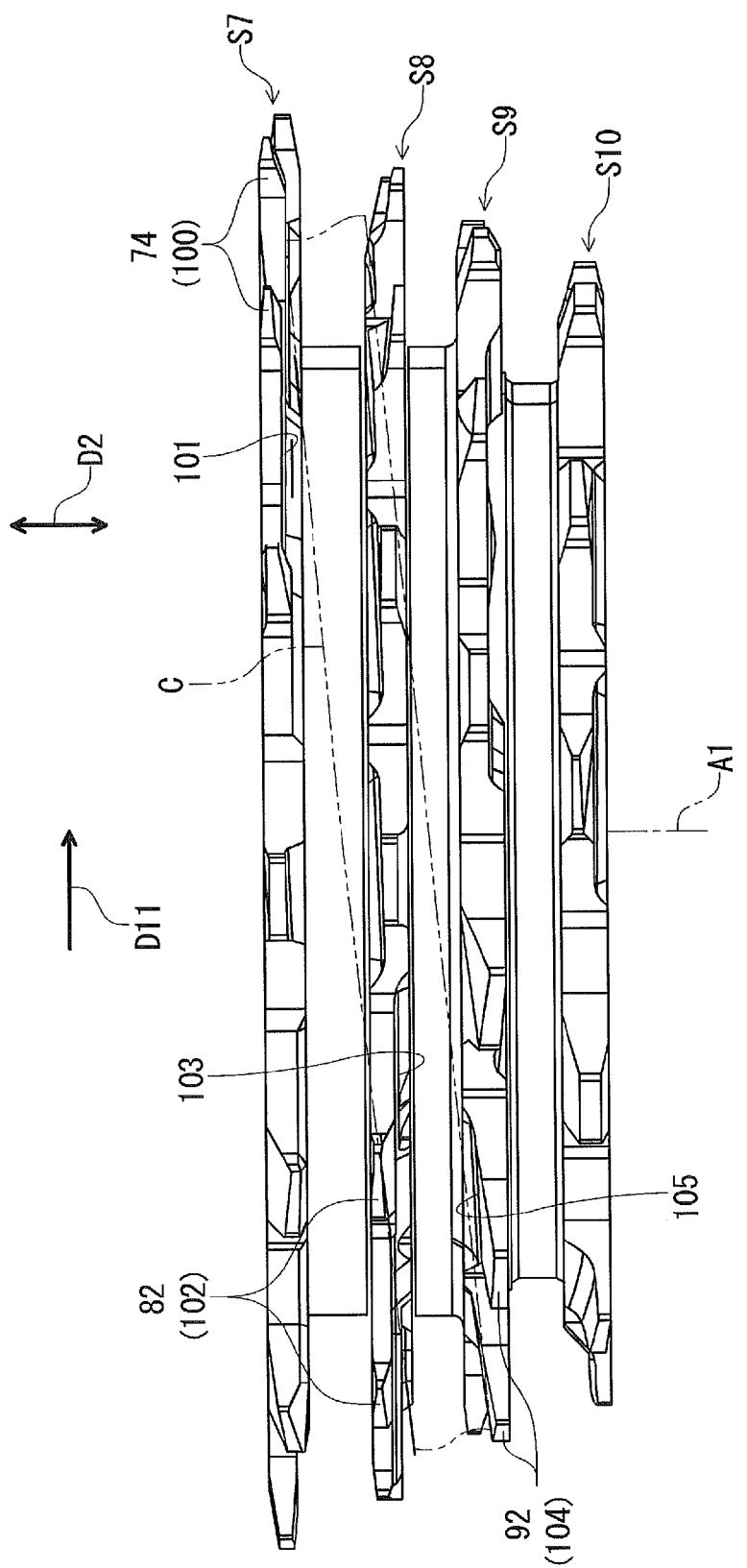
FIG. 29 is a partial top view of the bicycle multiple sprocket assembly.

As seen in FIG. 29, the first recessed tooth 100 and the third recessed tooth 104 allow the bicycle chain C to be inclined relative to the rotational center axis A1. This can facilitate shifting the bicycle chain C from the second sprocket element S9 to the third sprocket element S10, for example.

As seen in FIG. 25, the plurality of first teeth 74 include an additional recessed tooth 106. The additional recessed tooth 106 includes a base part 108 and a recessed end 110. The recessed end 110 extends radially outwardly from the base part 108. An axial thickness of the recessed end 110 is smaller than an axial thickness of the base part 108.

As seen in FIG. 16, the plurality of sprocket teeth 66 include fourth recessed teeth 112 configured to facilitate shifting the bicycle chain C from the first sprocket element S8 to the bicycle sprocket S7. An axial thickness of the fourth recessed tooth 112 is smaller than an axial thickness of other sprocket teeth 66. The bicycle sprocket S7 includes a fourth recess 114 disposed on the outward facing side 68 to provide the fourth recessed teeth 112.

As seen in FIG. 28, the recessed tooth 106 overlaps the fourth recessed teeth 112 in the axial direction D2 and faces the second sprocket element S9 in the axial direction D2. The recessed tooth 106 allows the bicycle chain C to be smoothly shifted toward the fourth recessed teeth 112 in the axial direction D2. This can facilitate shifting the bicycle chain C from the bicycle sprocket S8 to the bicycle sprocket S7.

With the bicycle sprocket, the at least one chain-curvature limiting protuberance can improve the holding function of the bicycle sprocket to hold the bicycle chain engaging with the independent neighboring bicycle sprocket.

With the bicycle multiple sprocket assembly 10, the at least one first chain-curvature limiting protuberance is configured to limit axial curvature of a bicycle chain engaging with the second sprocket. The at least one first independent chain-curvature limiting protuberance is configured to limit the axial curvature of the bicycle chain engaging with the first sprocket. Accordingly, it is possible to improve the holding function of the bicycle sprocket to hold the bicycle multiple sprocket assembly 10.

With the bicycle multiple sprocket assembly 10, the first recessed tooth 100 of the first sprocket element S8 is configured to facilitate shifting the bicycle chain C from the second sprocket element S9 to the third sprocket element S10 besides to facilitate shifting the bicycle chain from the first sprocket element S8 to the second sprocket element S9 or to a neighboring sprocket element S7 opposite to the second sprocket element S9 with respect to the first sprocket element S8. The second recessed tooth 102 of the second sprocket element S9 is configured to facilitate shifting the bicycle chain C from the second sprocket element S9 to the third sprocket element S10. Accordingly, it is possible to effectively facilitate shifting the bicycle chain C from the second sprocket element S9 to the third sprocket element S10.

Second Embodiment

A bicycle multiple sprocket assembly 210 in accordance with a second embodiment will be described below referring to FIG. 30. The bicycle multiple sprocket assembly 210 has the same configuration as the bicycle multiple sprocket assembly 10 except for the bicycle sprocket S3. Elements having substantially the same function as those in the first embodiment will be numbered the same here, and will not be described again in detail here for the sake of brevity.

Figure 30:
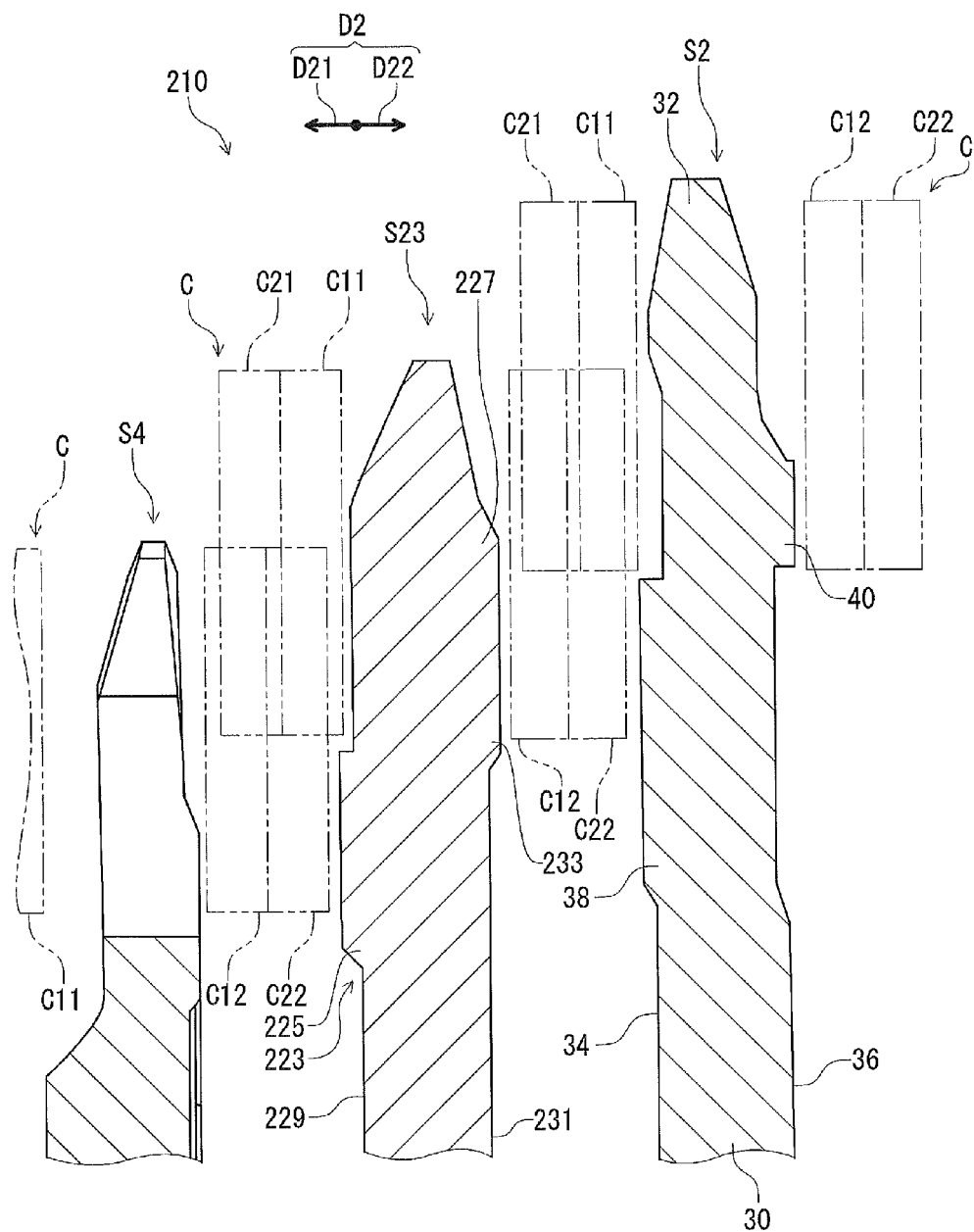
FIG. 30 is a partial cross-sectional view of a bicycle multiple sprocket assembly in accordance with a second embodiment.

As seen in FIG. 30, the bicycle multiple sprocket assembly 210 comprises a bicycle sprocket S23. The bicycle sprocket S23 has substantially the same structure as the structure of the bicycle sprocket S3 in the first embodiment. The bicycle sprocket S23 includes at least one chain-curvature limiting protuberance 223. Specifically, the bicycle sprocket S23 includes a plurality of chain-curvature limiting protuberances 223. The chain-curvature limiting protuberance 223 is configured to limit the axial curvature of the bicycle chain C engaging with an independent neighboring bicycle sprocket S2 or S4 which is adjacent to the bicycle sprocket S23 without another sprocket between the bicycle sprocket S23 and the independent neighboring bicycle sprocket S2 or S4.

In this embodiment, the at least one chain-curvature limiting protuberance 223 includes at least one first chain-curvature limiting protuberance 225 and at least one second chain-curvature limiting protuberance 227. The at least one first chain-curvature limiting protuberance 225 is disposed on an outward facing side 229. The at least one second chain-curvature limiting protuberance 227 is disposed on an inward facing side 231. Specifically, the at least one first chain-curvature limiting protuberance 225 is configured to limit the axial curvature of the bicycle chain C engaging with the independent neighboring bicycle sprocket S4. The at least one second chain-curvature limiting protuberance 227 is configured to limit the axial curvature of the bicycle chain C engaging with the independent neighboring bicycle sprocket S2.

The bicycle sprocket S23 further comprises at least one independent chain-curvature limiting protuberance 233 configured to limit the axial curvature of the bicycle chain C engaging with the bicycle sprocket S23. The at least one independent chain-curvature limiting protuberance 233 is disposed on at least one of the outward facing side 229 and the inward facing side 231. In this embodiment, the at least one independent chain-curvature limiting protuberance 233 is disposed on the inward facing side 231.

The independent chain-curvature limiting protuberance 233 is provided radially inwardly of the second chain-curvature limiting protuberance 227. The independent chain-curvature limiting protuberance 233 is provided integrally with the second chain-curvature limiting protuberance 227.

With the bicycle sprocket S23, it is possible to obtain substantially the same advantageous effects as those of the bicycle sprocket in accordance with the first embodiment.

Third Embodiment

A bicycle multiple sprocket assembly 310 in accordance with a third embodiment will be described below referring to FIG. 31. The bicycle multiple sprocket assembly 310 has the same configuration as the bicycle multiple sprocket assembly 210 except for the bicycle sprocket S23. Elements having substantially the same function as those in the above embodiments will be numbered the same here, and will not be described again in detail here for the sake of brevity.

Figure 31:
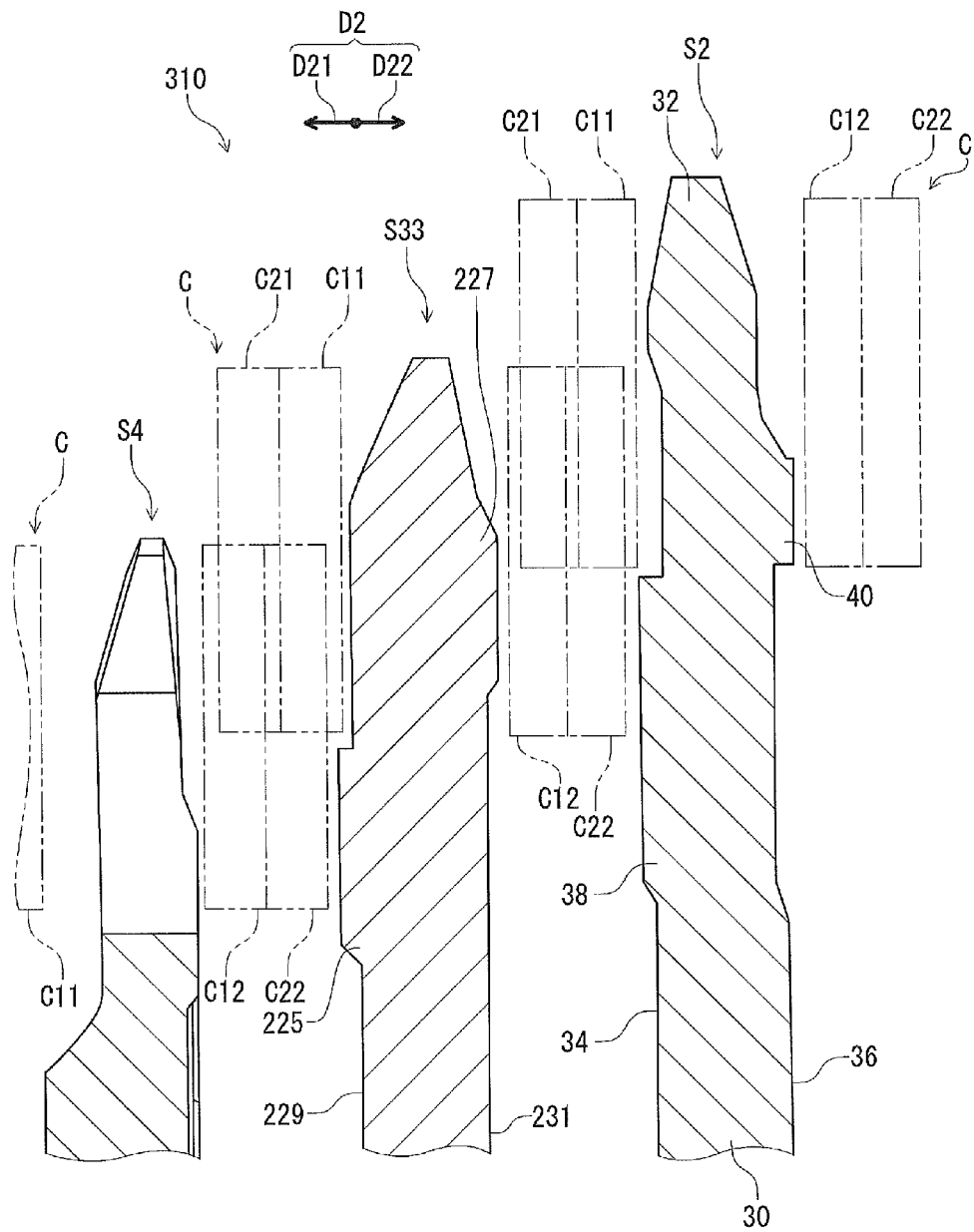
FIG. 31 is a partial cross-sectional view of a bicycle multiple sprocket assembly in accordance with a third embodiment.

As seen in FIG. 31, the bicycle multiple sprocket assembly 310 comprises a bicycle sprocket S33. The bicycle sprocket S33 has substantially the same structure as the structure of the bicycle sprocket S23 in the second embodiment. However, the independent chain-curvature limiting protuberance 233 is omitted from the bicycle sprocket S33. Instead, the second chain-curvature limiting protuberance 227 is configured to limit the axial curvature of the bicycle chain C engaging with the bicycle sprocket S2.

With the bicycle sprocket S33, it is possible to obtain substantially the same advantageous effects as those of the bicycle sprocket in accordance with the first embodiment.

Fourth Embodiment

A bicycle multiple sprocket assembly 410 in accordance with a fourth embodiment will be described below referring to FIG. 32. The bicycle multiple sprocket assembly 410 has the same configuration as the bicycle multiple sprocket assembly 10 except for the bicycle sprocket S2. Elements having substantially the same function as those in the above embodiments will be numbered the same here, and will not be described again in detail here for the sake of brevity.

Figure 32:
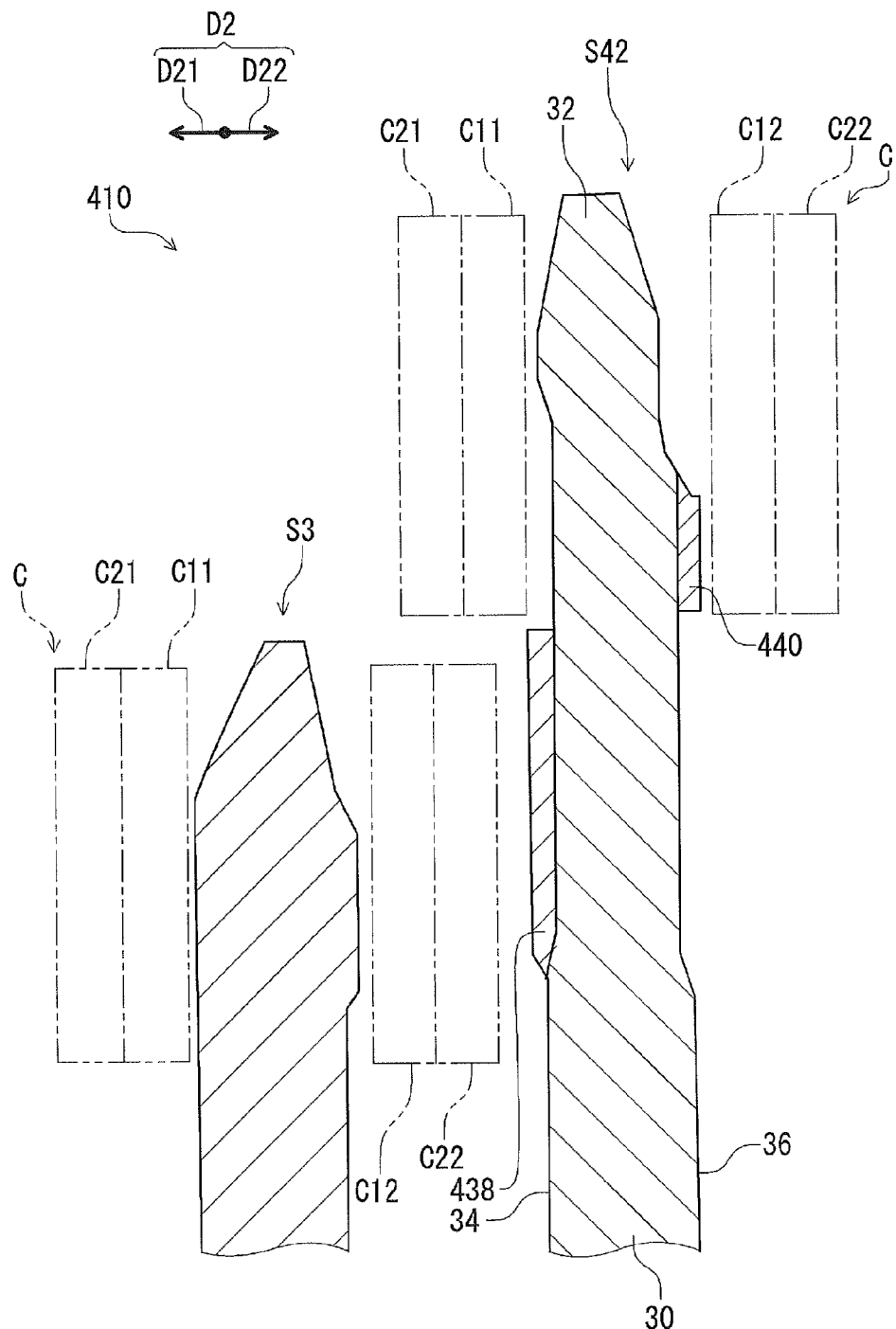
FIG. 32 is a partial cross-sectional view of a bicycle multiple sprocket assembly in accordance with a fourth embodiment.

As seen in FIG. 32, the bicycle multiple sprocket assembly 410 comprises a bicycle rear sprocket S42. The bicycle rear sprocket S42 has substantially the same structure as the structure of the bicycle sprocket S2 in the first embodiment. The bicycle rear sprocket S42 comprises at least one chain-curvature limiting protuberance 438. The at least one chain-curvature limiting protuberance 438 has substantially the same shape and function as those of the at least one chain-curvature limiting protuberance 38 in the first embodiment. Unlike the bicycle sprocket S2, however, the at least one chain-curvature limiting protuberance 438 is a separate member from at least one of the sprocket body 30 and the plurality of sprocket teeth 32 and is attached to the at least one of the outward facing side 34 and the inward facing side 36. In this embodiment, the at least one chain-curvature limiting protuberance 438 is attached to the outward facing side 34.

The at least one chain-curvature limiting protuberance 438 includes a metallic material. The at least one chain-curvature limiting protuberance 438 is attached to the at least one of the outward facing side 34 and the inward facing side 36 via one of adhesive, diffusion bonding, and caulking. In this embodiment, the sprocket body 30 and the sprocket teeth 32 include a metallic material. The at least one chain-curvature limiting protuberance 438 is attached to the outward facing side 34 via one of adhesive and diffusion bonding. In a case where the at least one chain-curvature limiting protuberance 438 is attached to the outward facing side 34 via caulking, the at least one chain-curvature limiting protuberance 438 is fixedly engaged with the outward facing side 34 by being deformed when the bicycle rear sprocket S42 is manufactured.

The bicycle rear sprocket S42 further comprises at least one independent chain-curvature limiting protuberance 440. The at least one independent chain-curvature limiting protuberance 440 has substantially the same shape and function as those of the at least one independent chain-curvature limiting protuberance 40 in the first embodiment. Unlike the bicycle sprocket S2, however, the at least one independent chain-curvature limiting protuberance 440 is a separate member from at least one of the sprocket body 30 and the plurality of sprocket teeth 32 and is attached to the at least one of the outward facing side 34 and the inward facing side 36. In this embodiment, the at least one independent chain-curvature limiting protuberance 440 is attached to the inward facing side 36.

The at least one independent chain-curvature limiting protuberance 440 includes a metallic material. The at least one independent chain-curvature limiting protuberance 440 is attached to the at least one of the outward facing side 34 and the inward facing side 36 via one of adhesive, diffusion bonding, and caulking. In this embodiment, the at least one independent chain-curvature limiting protuberance 440 is attached to the inward facing side 36 via one of adhesive and diffusion bonding. In a case where the at least one independent chain-curvature limiting protuberance 440 is attached to the outward facing side 34 via caulking, the at least one independent chain-curvature limiting protuberance 440 is fixedly engaged with the outward facing side 34 by being deformed when the bicycle rear sprocket S42 is manufactured.

With the bicycle sprocket S42, it is possible to obtain substantially the same advantageous effects as those of the bicycle sprocket in accordance with the first embodiment.

With the bicycle rear sprocket 410, the at least one chain-curvature limiting protuberance 438 is a separate member from at least one of the sprocket body 30 and the plurality of sprocket teeth 32. Thus, it is possible to freely select a shape and/or a material of the at least one chain-curvature limiting protuberance 438.

Fifth Embodiment

A bicycle multiple sprocket assembly 510 in accordance with a fifth embodiment will be described below referring to FIG. 33. The bicycle multiple sprocket assembly 510 has the same configuration as the bicycle multiple sprocket assembly 10 except for the bicycle sprocket S2. Elements having substantially the same function as those in the above embodiments will be numbered the same here, and will not be described again in detail here for the sake of brevity.

Figure 33:
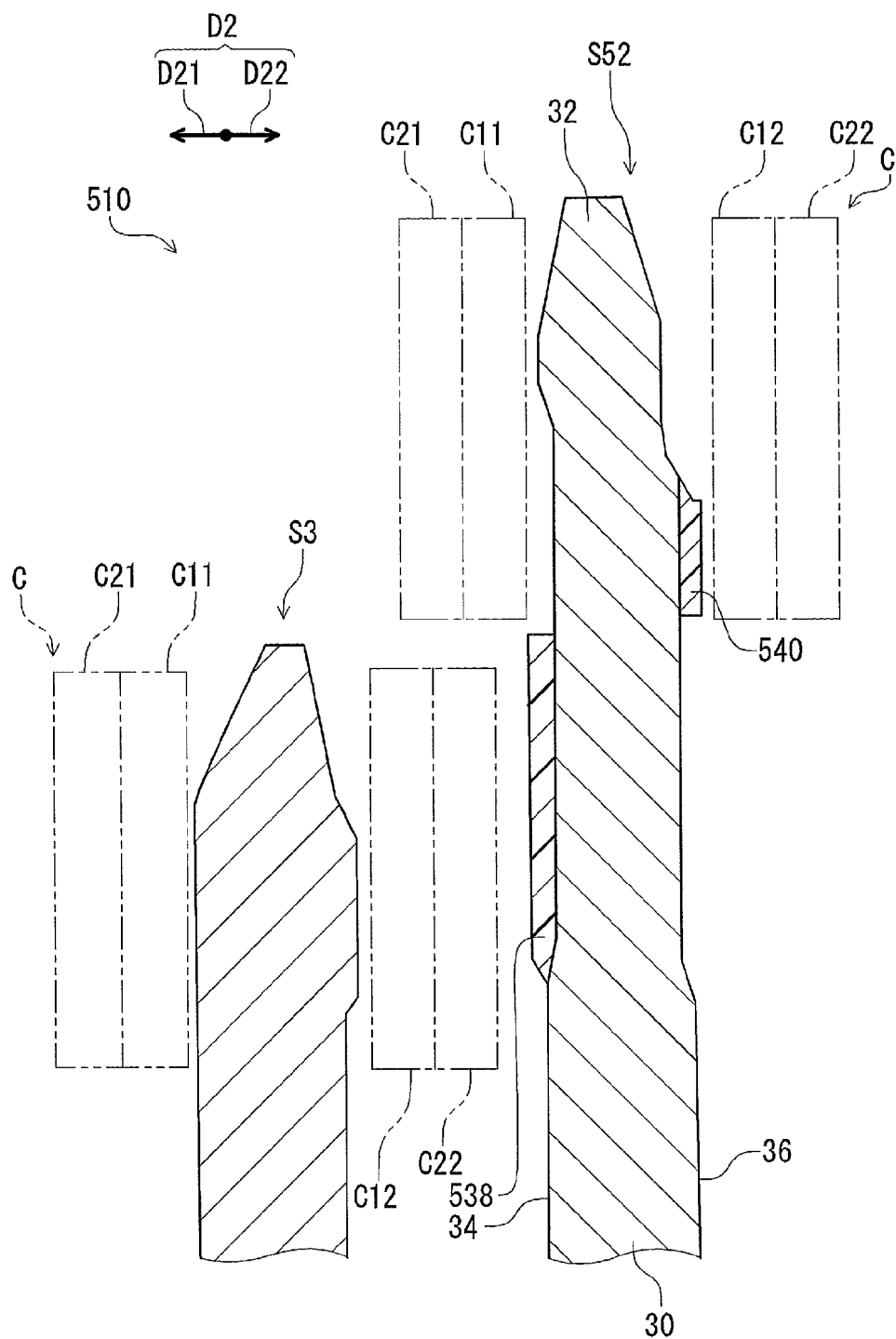
FIG. 33 is a partial cross-sectional view of a bicycle multiple sprocket assembly in accordance with a fifth embodiment.

As seen in FIG. 33, the bicycle multiple sprocket assembly 510 comprises a bicycle rear sprocket S52. The bicycle rear sprocket S52 has substantially the same structure as the structure of the bicycle sprocket S2 in the first embodiment. The bicycle rear sprocket S52 comprises at least one chain-curvature limiting protuberance 538. The at least one chain-curvature limiting protuberance 538 has substantially the same shape and function as those of the at least one chain-curvature limiting protuberance 38 in the first embodiment. Unlike the bicycle sprocket S2, however, the at least one chain-curvature limiting protuberance 538 is a separate member from at least one of the sprocket body 30 and the plurality of sprocket teeth 32 and is attached to the at least one of the outward facing side 34 and the inward facing side 36. In this embodiment, the at least one chain-curvature limiting protuberance 538 is attached to the outward facing side 34.

The at least one chain-curvature limiting protuberance 538 includes a non-metallic material. The at least one chain-curvature limiting protuberance 538 is attached to the at least one of the outward facing side and the inward facing side via one of adhesive and integral molding. In this embodiment, the at least one chain-curvature limiting protuberance 538 is attached to the outward facing side 34 via adhesive.

The bicycle rear sprocket S52 further comprises at least one independent chain-curvature limiting protuberance 540. The at least one independent chain-curvature limiting protuberance 540 has substantially the same shape and function as those of the at least one independent chain-curvature limiting protuberance 40 in the first embodiment. Unlike the bicycle sprocket S2, however, the at least one independent chain-curvature limiting protuberance 540 is a separate member from at least one of the sprocket body 30 and the plurality of sprocket teeth 32 and is attached to the at least one of the outward facing side 34 and the inward facing side 36. In this embodiment, the at least one independent chain-curvature limiting protuberance 540 is attached to the inward facing side 36.

The at least one independent chain-curvature limiting protuberance includes a non-metallic material. The at least one independent chain-curvature limiting protuberance is attached to the at least one of the outward facing side and the inward facing side via one of adhesive and integral molding. In this embodiment, the at least one independent chain-curvature limiting protuberance 540 is attached to the inward facing side 36 via adhesive.

With the bicycle sprocket S52, it is possible to obtain substantially the same advantageous effects as those of the bicycle sprocket in accordance with the first embodiment.

With the bicycle rear sprocket S10, the at least one chain-curvature limiting protuberance 538 is a separate member from at least one of the sprocket body 30 and the plurality of sprocket teeth 32. Thus, it is possible to freely select a shape and/or a material of the at least one chain-curvature limiting protuberance 538.

Sixth Embodiment

A bicycle multiple sprocket assembly 610 in accordance with a sixth embodiment will be described below referring to FIG. 34. The bicycle multiple sprocket assembly 610 has the same configuration as the bicycle multiple sprocket assembly 10 except for the bicycle sprocket S2. Elements having substantially the same function as those in the above embodiments will be numbered the same here, and will not be described again in detail here for the sake of brevity.

Figure 34:
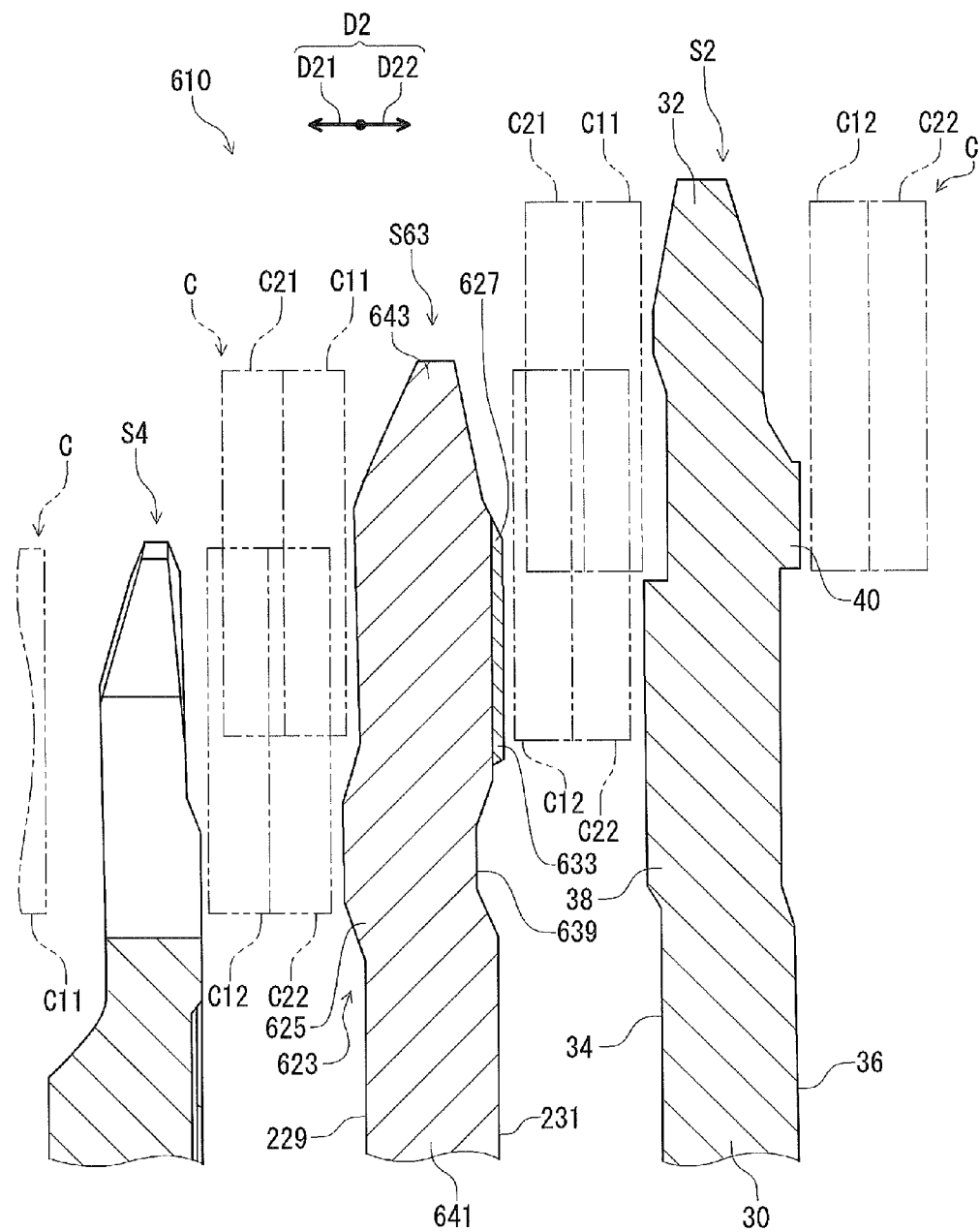
FIG. 34 is a partial cross-sectional view of a bicycle multiple sprocket assembly in accordance with a sixth embodiment.

As seen in FIG. 34, the bicycle multiple sprocket assembly 610 comprises a bicycle rear sprocket S63. The bicycle rear sprocket S63 has substantially the same structure as the structure of the bicycle sprocket S23 in the second embodiment. The bicycle sprocket S63 comprises at least one chain-curvature limiting protuberance 623. The at least one chain-curvature limiting protuberance 623 include at least one first chain-curvature limiting protuberance 625 and at least one second chain-curvature limiting protuberance 627.

The at least one first chain-curvature limiting protuberance 625 has substantially the same shape and function as those of the at least one first chain-curvature limiting protuberance 225 in the second embodiment. The at least one second chain-curvature limiting protuberance 627 has substantially the same shape and function as those of the at least one second chain-curvature limiting protuberance 227 in the second embodiment.

However, one of the at least one first chain-curvature limiting protuberance 625 and the at least one second chain-curvature limiting protuberance 627 is provided on one of the outward facing side 229 and the inward facing side 231 with axial press working from the other of the outward facing side 229 and the inward facing side 231 toward the one of the outward facing side 229 and the inward facing side 231. In this embodiment, the at least one first chain-curvature limiting protuberance 625 is provided on the outward facing side 229 with axial press working from the inward facing side 231 toward the outward facing side 229. The bicycle sprocket S63 includes a recess 639 provided on an opposite side of the chain-curvature limiting protuberance 625 in the axial direction D2. In this embodiment, the recess 639 is provided on the inward facing side 231 and is formed by the axial press working.

The other of the at least one first chain-curvature limiting protuberance 625 and the at least one second chain-curvature limiting protuberance 627 is a separate member from at least one of the sprocket body 641 and the plurality of sprocket teeth 643 and is attached to the at least one of the outward facing side 229 and the inward facing side 231. In this embodiment, the at least one second chain-curvature limiting protuberance 627 is a separate member from a sprocket body 641 and a plurality of sprocket teeth 643 and is attached to the at least one of the outward facing side 229 and the inward facing side 231.

The bicycle sprocket S63 further comprises at least one independent chain-curvature limiting protuberance 633. The at least one independent chain-curvature limiting protuberance 633 has substantially the same shape and function as those of the at least one independent chain-curvature limiting protuberance 233 in the second embodiment. However, the at least one independent chain-curvature limiting protuberance 633 is integrally provided with the at least one second chain-curvature limiting protuberance 627 as a single unitary member. The second chain-curvature limiting protuberance 627 and the independent chain-curvature limiting protuberance 633 can be partly provided in the recess 639.

With the bicycle sprocket S63, it is possible to obtain substantially the same advantageous effects as those of the bicycle sprocket in accordance with the first embodiment.

With the bicycle rear sprocket 610, the at least one second chain-curvature limiting protuberance 627 is a separate member from at least one of the sprocket body 641 and the plurality of sprocket teeth 643. Thus, it is possible to freely select a shape and/or a material of the at least one second chain-curvature limiting protuberance 627.

Seventh Embodiment

A bicycle multiple sprocket assembly 710 in accordance with a seventh embodiment will be described below referring to FIG. 35. The bicycle multiple sprocket assembly 710 has the same configuration as the bicycle multiple sprocket assembly 610 except for the bicycle sprocket S63. Elements having substantially the same function as those in the above embodiments will be numbered the same here, and will not be described again in detail here for the sake of brevity.

Figure 35:
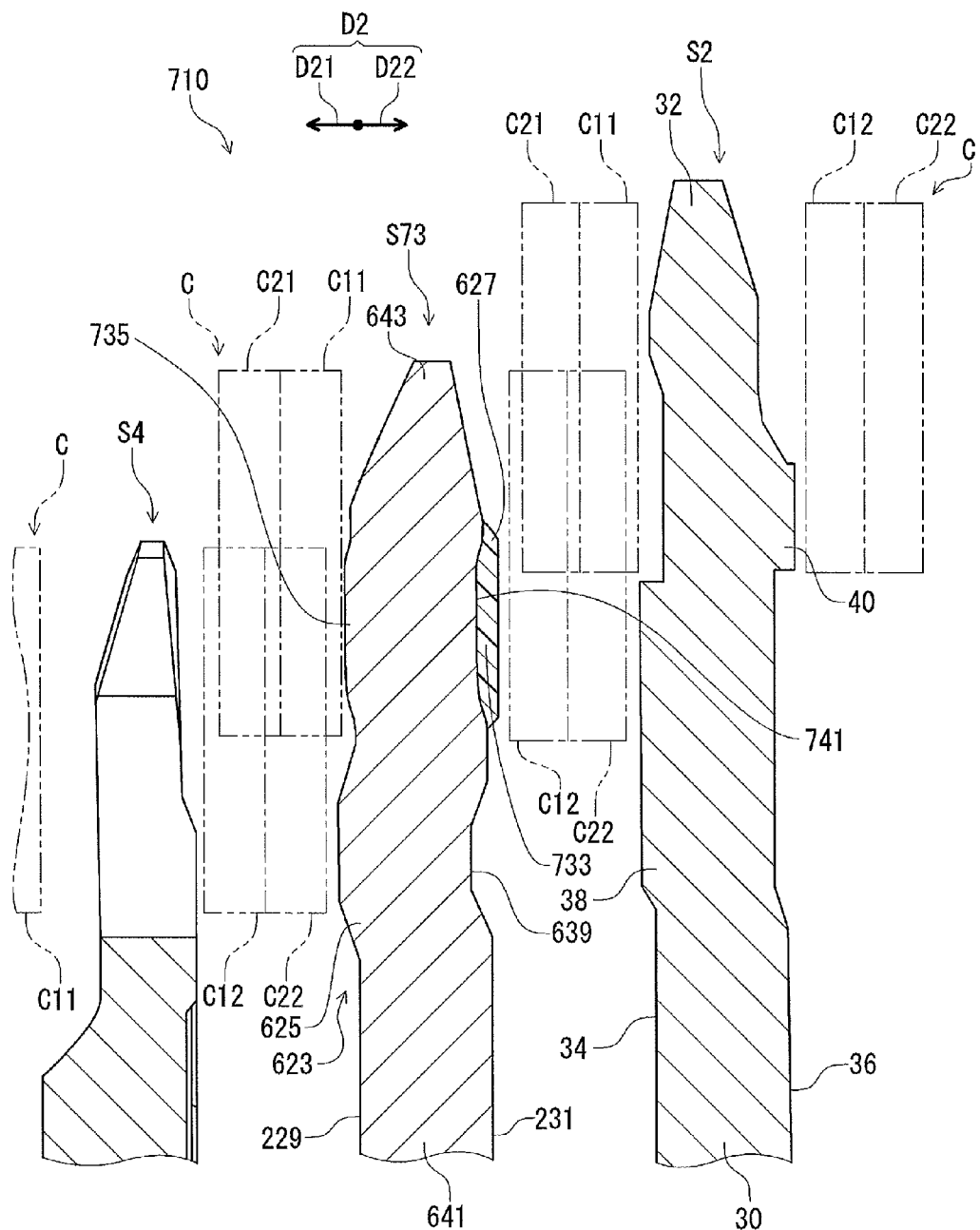
FIG. 35 is a partial cross-sectional view of a bicycle multiple sprocket assembly in accordance with a seventh embodiment.

As seen in FIG. 35, the bicycle multiple sprocket assembly 710 comprises a bicycle rear sprocket S73. The bicycle rear sprocket S73 has substantially the same structure as the structure of the bicycle sprocket S63 in the sixth embodiment. The bicycle sprocket S73 further comprises at least one independent chain-curvature limiting protuberance 733 and/or 735 configured to limit the axial curvature of the bicycle chain C engaging with the bicycle sprocket S73. The at least one independent chain-curvature limiting protuberance 733 and/or 735 is disposed on at least one of the outward facing side 229 and the inward facing side 231.

One of the at least one independent chain-curvature limiting protuberance 733 and/or 735 is provided on one of the outward facing side 229 and the inward facing side 231 with axial press working from the other of the outward facing side 229 and the inward facing side 231 toward the one of the outward facing side 229 and the inward facing side 231. In this embodiment, the at least one independent chain-curvature limiting protuberance 735 is provided on the outward facing side 229 with axial press working from the inward facing side 231 toward the outward facing side 229. The bicycle sprocket S73 includes a recess 741 provided on an opposite side of the independent chain-curvature limiting protuberance 735 in the axial direction D2. In this embodiment, the recess 741 is provided on the inward facing side 231 and is formed by the axial press working.

Another of the at least one independent chain-curvature limiting protuberance 733 and/or 735 is a separate member from at least one of the sprocket body 641 and the plurality of sprocket teeth 643 and is attached to the other of the outward facing side 229 and the inward facing side 231. In this embodiment, the independent chain-curvature limiting protuberance 733 is a separate member from the sprocket body 641 and the plurality of sprocket teeth 643 and is attached to the inward facing side 231. The independent chain-curvature limiting protuberance 733 is provided in the recess 741 and covers the recess 741. In this embodiment, the second chain-curvature limiting protuberance 627 is integrally provided with the independent chain-curvature limiting protuberance 733 as a single unitary member. Examples of the material of the independent chain-curvature limiting protuberance 733 and the second chain-curvature limiting protuberance 627 include a resin material. In this embodiment, the at least one independent chain-curvature limiting protuberance 733 is attached to the inward facing side 231 via adhesive, for example.

With the bicycle sprocket S73, it is possible to obtain substantially the same advantageous effects as those of the bicycle sprocket S63 in accordance with the sixth embodiment.

It will be apparent to those skilled in the bicycle field from the present disclosure that the above embodiments can be combined with each other.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" or "element" when used in the singular can have the dual meaning of a single part or a plurality of parts.

The ordinal numbers such as the terms "first" or "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle sprocket having a rotational center axis, an outward facing side facing in an axial direction parallel to the rotational center axis and an inward facing side facing in the axial direction, the inward facing side being opposite to the outward facing side in the axial direction, the bicycle sprocket comprising:
    a sprocket body configured to be rotatable about the rotational center axis;
    a plurality of sprocket teeth extending radially outward from an outer periphery of the sprocket body; and
    at least one chain-curvature limiting protuberance configured to limit axial curvature of a bicycle chain engaging with an independent neighboring bicycle sprocket which is adjacent to the bicycle sprocket without another sprocket between the bicycle sprocket and the independent neighboring bicycle sprocket when the bicycle chain overlaps a central portion of the at least one chain-curvature limiting protuberance in the axial direction, the axial curvature being curvature of the bicycle chain relative to the bicycle sprocket when viewed from a radial direction perpendicular to the rotational center axis, the at least one chain-curvature limiting protuberance being disposed on at least one of the outward facing side and the inward facing side.

2. The bicycle sprocket according to claim 1, wherein the at least one chain-curvature limiting protuberance is intermittently disposed on at least one of the outward facing side and the inward facing side in a circumferential direction with respect to the rotational center axis.

3. The bicycle sprocket according to claim 1, wherein the at least one chain-curvature limiting protuberance is disposed on the outward facing side.

4. The bicycle sprocket according to claim 1, wherein the at least one chain-curvature limiting protuberance is disposed on the inward facing side.

5. The bicycle sprocket according to claim 1, wherein the at least one chain-curvature limiting protuberance includes at least one first chain-curvature limiting protuberance and at least one second chain-curvature limiting protuberance,
    the at least one first chain-curvature limiting protuberance is disposed on the outward facing side, and
    the at least one second chain-curvature limiting protuberance is disposed on the inward facing side.

6. The bicycle sprocket according to claim 5, further comprising:
    at least one independent chain-curvature limiting protuberance configured to limit the axial curvature of the bicycle chain engaging with the bicycle sprocket, wherein
    the at least one independent chain-curvature limiting protuberance is disposed on at least one of the outward facing side and the inward facing side.

7. The bicycle sprocket according to claim 6, wherein one of the at least one independent chain-curvature limiting protuberance is provided on one of the outward facing side and the inward facing side with axial press working from the other of the outward facing side and the inward facing side toward the one of the outward facing side and the inward facing side, and
    another of the at least one independent chain-curvature limiting protuberance is a separate member from at least one of the sprocket body and the plurality of sprocket teeth and is attached to the other of the outward facing side and the inward facing side.

8. The bicycle sprocket according to claim 1, further comprising:
    at least one independent chain-curvature limiting protuberance configured to limit the axial curvature of the bicycle chain engaging with the bicycle sprocket, wherein
    the at least one independent chain-curvature limiting protuberance is disposed on at least one of the outward facing side and the inward facing side.

9. The bicycle sprocket according to claim 8, wherein the at least one independent chain-curvature limiting protuberance is disposed on the inward facing side.

10. The bicycle sprocket according to claim 9, wherein the axial thickness of the at least one independent chain-curvature limiting protuberance is in a range of 0.20 mm to 0.30 mm.

11. The bicycle sprocket according to claim 10, wherein the axial thickness of the at least one independent chain-curvature limiting protuberance is 0.25 mm.

12. The bicycle sprocket according to claim 9, wherein the axial thickness of the at least one chain-curvature limiting protuberance is smaller than the axial thickness of the at least one independent chain-curvature limiting protuberance.

13. The bicycle sprocket according to claim 8, wherein the at least one independent chain-curvature limiting protuberance is disposed radially outwardly of the at least one chain-curvature limiting protuberance.

14. The bicycle sprocket according to claim 8, wherein the at least one independent chain-curvature limiting protuberance is provided on one of the outward facing side and the inward facing side with axial press working from the other of the outward facing side and the inward facing side toward the one of the outward facing side and the inward facing side.

15. The bicycle sprocket according to claim 8, wherein the at least one independent chain-curvature limiting protuberance is a separate member from at least one of the sprocket body and the plurality of sprocket teeth and is attached to the at least one of the outward facing side and the inward facing side.

16. The bicycle sprocket according to claim 15, wherein the at least one independent chain-curvature limiting protuberance includes a metallic material.

17. The bicycle sprocket according to claim 16, wherein the at least one independent chain-curvature limiting protuberance is attached to the at least one of the outward facing side and the inward facing side via one of adhesive, diffusion bonding, and swaging.

18. The bicycle sprocket according to claim 15, wherein the at least one independent chain-curvature limiting protuberance includes a non-metallic material.

19. The bicycle sprocket according to claim 18, wherein the at least one independent chain-curvature limiting protuberance is attached to the at least one of the outward facing side and the inward facing side via one of adhesive and integral molding.

20. The bicycle sprocket according to claim 1, wherein an axial thickness of the at least one chain-curvature limiting protuberance is in a range of 0.10 mm to 0.15 mm.

21. The bicycle sprocket according to claim 20, wherein the axial thickness of the at least one chain-curvature limiting protuberance is 0.14 mm.

22. The bicycle sprocket according to claim 1, wherein the at least one chain-curvature limiting protuberance is a separate member from at least one of the sprocket body and the plurality of sprocket teeth and is attached to the at least one of the outward facing side and the inward facing side.

23. The bicycle sprocket according to claim 22, wherein the at least one chain-curvature limiting protuberance includes a metallic material.

24. The bicycle sprocket according to claim 23, wherein the at least one chain-curvature limiting protuberance is attached to the at least one of the outward facing side and the inward facing side via one of adhesive, diffusion bonding, and swaging.

25. The bicycle sprocket according to claim 22, wherein the at least one chain-curvature limiting protuberance includes a non-metallic material.

26. The bicycle sprocket according to claim 25, wherein the at least one chain-curvature limiting protuberance is attached to the at least one of the outward facing side and the inward facing side via one of adhesive and integral molding.

27. The bicycle sprocket according to claim 1, wherein the bicycle sprocket is a bicycle rear sprocket.

28. The bicycle sprocket according to claim 1, wherein the at least one chain-curvature limiting protuberance is configured to contact an axial outer surface of the bicycle chain when the bicycle chain engages with the independent neighboring bicycle sprocket adjacent to the bicycle sprocket.

29. The bicycle sprocket according to claim 1, further comprising:
at least one independent chain-curvature limiting protuberance configured to limit the axial curvature of the bicycle chain engaging with the bicycle sprocket, wherein
the at least one independent chain-curvature limiting protuberance at least partly radially overlaps the at least one chain-curvature limiting protuberance when viewed from the radial direction perpendicular to the rotational center axis.

30. The bicycle sprocket according to claim 1, wherein the bicycle chain includes a roller and link plates that at least partly overlap the roller in the axial direction, and
the at least one chain-curvature limiting protuberance is configured to limit axial curvature of the bicycle chain when the roller engages with the independent neighboring bicycle sprocket and at least one of the link plates at least partly overlaps the at least one chain-curvature limiting protuberance in the axial direction.

31. The bicycle sprocket according to claim 1, wherein the at least one chain-curvature limiting protuberance is disposed radially inward with respect to an immediately adjacent one of the plurality of sprocket teeth.

32. A bicycle sprocket having a rotational center axis, an outward facing side facing in an axial direction parallel to the rotational center axis and an inward facing side facing in the axial direction, the inward facing side being opposite to the outward facing side in the axial direction, the bicycle sprocket comprising:
a sprocket body configured to be rotatable about the rotational center axis;
a plurality of sprocket teeth extending radially outward from an outer periphery of the sprocket body;
at least one chain-curvature limiting protuberance configured to limit axial curvature of a bicycle chain engaging with an independent neighboring bicycle sprocket which is adjacent to the bicycle sprocket without another sprocket between the bicycle sprocket and the independent neighboring bicycle sprocket, the axial curvature being curvature of the bicycle chain relative to the bicycle sprocket when viewed from a radial direction perpendicular to the rotational center axis, the at least one chain-curvature limiting protuberance being disposed on at least one of the outward facing side and the inward facing side; and at least one independent chain-curvature limiting protuberance configured to limit the axial curvature of the bicycle chain engaging with the bicycle sprocket, wherein the at least one independent chain-curvature limiting protuberance is disposed on at least one of the outward facing side and the inward facing side, and the at least one independent chain-curvature limiting protuberance is disposed on the outward facing side and the inward facing side.

33. A bicycle sprocket having a rotational center axis, an outward facing side facing in an axial direction parallel to the rotational center axis and an inward facing side facing in the axial direction, the inward facing side being opposite to the outward facing side in the axial direction, the bicycle sprocket comprising:

a sprocket body configured to be rotatable about the rotational center axis;

a plurality of sprocket teeth extending radially outward from an outer periphery of the sprocket body; and at least one chain-curvature limiting protuberance configured to limit axial curvature of a bicycle chain engaging with an independent neighboring bicycle sprocket which is adjacent to the bicycle sprocket without another sprocket between the bicycle sprocket and the independent neighboring bicycle sprocket, the axial curvature being curvature of the bicycle chain relative to the bicycle sprocket when viewed from a radial direction perpendicular to the rotational center axis, the at least one chain-curvature limiting protuberance being disposed on at least one of the outward facing side and the inward facing side, wherein the at least one chain-curvature limiting protuberance is provided on one of the outward facing side and the inward facing side with axial press working from the other of the outward facing side and the inward facing side toward the one of the outward facing side and the inward facing side.

34. A bicycle multiple sprocket assembly comprising:

a first sprocket having a rotational center axis, a first outward facing side facing in an axial direction parallel to the rotational center axis and a first inward facing side facing in the axial direction, the first inward facing side being opposite to the first outward facing side in the axial direction, the first sprocket comprising:

a first sprocket body;

a plurality of first sprocket teeth extending radially outward from an outer periphery of the first sprocket body;

at least one first chain-curvature limiting protuberance disposed on the first outward facing side; and at least one first independent chain-curvature limiting protuberance disposed on the first inward facing side; and a second sprocket adjacent to the first sprocket without another sprocket between the first sprocket and the second sprocket, the second sprocket having the rotational center axis, a second outward facing side facing in the axial direction and a second inward facing side facing in the axial direction, the second inward facing side being opposite to the second outward facing side in the axial direction, the second inward facing side facing the first outward facing side in the axial direction, the second bicycle sprocket comprising:

a second sprocket body;

a plurality of second sprocket teeth extending radially outward from an outer periphery of the second sprocket body, a total number of the plurality of second sprocket teeth being less than a total number of the plurality of first sprocket teeth by two or more;

the at least one first chain-curvature limiting protuberance being configured to limit axial curvature of a bicycle chain engaging with the second sprocket when the bicycle chain overlaps a central portion the at least one chain-curvature limiting protuberance in the axial direction, the axial curvature being curvature of the bicycle chain relative to the bicycle multiple sprocket assembly when viewed from a radial direction perpendicular to the rotational center axis, and the at least one first independent chain-curvature limiting protuberance being configured to limit the axial curvature of the bicycle chain engaging with the first sprocket.

35. The bicycle multiple sprocket assembly according to claim 34, wherein the at least one first independent chain-curvature limiting protuberance is disposed on the first inward facing side and the first outward facing side.

36. The bicycle multiple sprocket assembly according to claim 34, further comprising:

a third sprocket adjacent to the second sprocket without another sprocket between the second sprocket and the third sprocket, the third sprocket having the rotational center axis, the third sprocket comprising:

a third sprocket body; and a plurality of third sprocket teeth extending radially outward from an outer periphery of the third sprocket body, a total number of the plurality of third sprocket teeth being less than the total number of the plurality of second sprocket teeth by two or more, wherein the second sprocket comprises at least one second independent chain-curvature limiting protuberance disposed on the second inward facing side, the at least one second independent chain-curvature limiting protuberance is configured to limit the axial curvature of the bicycle chain engaging with the second sprocket, and the second sprocket is free from a chain-curvature limiting protuberance configured to limit the axial curvature of the bicycle chain engaging with at least one of the first sprocket and the third sprocket.

37. The bicycle multiple sprocket assembly according to claim 34, further comprising:

a third sprocket adjacent to the second sprocket without another sprocket between the second sprocket and the third sprocket, the third sprocket having the rotational center axis, the third sprocket comprising:

a third sprocket body;

a plurality of third sprocket teeth extending radially outward from an outer periphery of the third sprocket body; and a fourth sprocket adjacent to the third sprocket without another sprocket between the third sprocket and the fourth sprocket, the fourth sprocket having the rotational center axis, the fourth sprocket comprising:

a fourth sprocket body;

a plurality of fourth sprocket teeth extending radially outward from an outer periphery of the fourth sprocket body, a total number of the plurality of fourth sprocket teeth being less than the total number of the plurality of third sprocket teeth by one, wherein the third sprocket is free from a chain-curvature limiting protuberance configured to limit the axial curvature of the bicycle chain engaging with at least one of the second sprocket and the fourth sprocket.

38. A bicycle rear sprocket having a rotational center axis, an outward facing side facing in an axial direction parallel to the rotational center axis and an inward facing side facing in the axial direction, the inward facing side being opposite to the outward facing side in the axial direction, the bicycle rear sprocket comprising:
a sprocket body;
a plurality of sprocket teeth extending radially outward from an outer periphery of the sprocket body;
at least one chain-curvature limiting protuberance configured to limit axial curvature of a bicycle chain engaging with an independent neighboring bicycle sprocket which is adjacent to the bicycle sprocket without another sprocket between the bicycle sprocket and the independent neighboring bicycle sprocket when the bicycle chain overlaps a central portion the at least one chain-curvature limiting protuberance in the axial direction, the axial curvature being curvature of the bicycle chain relative to the bicycle sprocket when viewed from a radial direction perpendicular to the rotational center axis, the at least one chain-curvature limiting protuberance being disposed on at least one of the outward facing side and the inward facing side, the at least one chain-curvature limiting protuberance being disposed on at least one of the outward facing side and the inward facing side, the at least one chain-curvature limiting protuberance being a separate member from at least one of the sprocket body and the plurality of sprocket teeth and attached to the at least one of the outward facing side and the inward facing side.

39. A bicycle multiple sprocket assembly comprising:
a first sprocket element having a rotational center axis, the first sprocket element comprising:
a first body; and
a plurality of first teeth extending radially outward from an outer periphery of the first body, the plurality of first teeth including a first recessed tooth;
at least one first chain-curvature limiting protuberance disposed on at least one of an outward facing side and an inward facing side of the first body; and
a second sprocket element adjacent to the first sprocket element without another sprocket between the first sprocket element and the second sprocket element, the first recessed tooth being configured to facilitate shifting a bicycle chain from the first sprocket element to a neighboring sprocket element adjacent to the first sprocket element without another sprocket element between the first sprocket element and the neighboring sprocket element, the second sprocket element having the rotational center axis, the second sprocket element comprising:
a second body; and
a plurality of second teeth extending radially outward from an outer periphery of the second body, a total number of the plurality of second teeth being less than a total number of the plurality of first teeth, the plurality of second teeth including a second recessed tooth configured to facilitate shifting the bicycle chain from the second sprocket element to a third sprocket element adjacent to the second sprocket element without another sprocket between the second sprocket element and the third sprocket element, the third sprocket element including a plurality of third teeth, a total number of the plurality of third teeth being less than the total number of the plurality of second teeth,
the first recessed tooth being configured to facilitate shifting the bicycle chain from the second sprocket element to the third sprocket element, and
the at least one first chain-curvature limiting protuberance being configured to limit axial curvature of the bicycle chain when the bicycle chain engages with the second sprocket element and overlaps a central portion the at least one chain-curvature limiting protuberance in an axial direction, the axial curvature being curvature of the bicycle chain relative to the bicycle multiple sprocket assembly when viewed from a radial direction perpendicular to the rotational center axis.

40. The bicycle multiple sprocket assembly according to claim 39, wherein
the first recessed tooth is configured to facilitate upshifting from the first sprocket element.

41. The bicycle multiple sprocket assembly according to claim 39, wherein
the first recessed tooth is configured to facilitate downshifting from the first sprocket element.

42. The bicycle multiple sprocket assembly according to claim 39, wherein
the second recessed tooth is configured to facilitate upshifting from the second sprocket element.

43. The bicycle multiple sprocket assembly according to claim 39, further comprising:
the third sprocket element having the rotational center axis, the third sprocket element comprising:
a third body; and
the plurality of third teeth extending radially outward from an outer periphery of the third body, the plurality of third teeth including a third recessed tooth configured to facilitate shifting the bicycle chain from the second sprocket element to the third sprocket element.

44. The bicycle multiple sprocket assembly according to claim 43, wherein
the third recessed tooth faces the second sprocket element in an axial direction parallel to the rotational center axis.

45. The bicycle multiple sprocket assembly according to claim 43, wherein
the first recessed tooth is provided on a downstream side of the third recessed tooth in a driving rotational direction in which the bicycle multiple sprocket assembly rotates about the rotational center axis during pedaling.

46. The bicycle multiple sprocket assembly according to claim 43, wherein
the second recessed tooth is provided on a downstream side of the third recessed tooth in a driving rotational direction in which the bicycle multiple sprocket assembly rotates about the rotational center axis during pedaling.

47. The bicycle multiple sprocket assembly according to claim 39, wherein
the bicycle multiple sprocket assembly is a bicycle rear sprocket assembly.

48. The bicycle multiple sprocket assembly according to claim 39, wherein
the first recessed tooth faces the second sprocket element in an axial direction parallel to the rotational center axis.

49. The bicycle multiple sprocket assembly according to claim 39, wherein the second recessed tooth faces the third sprocket in an axial direction parallel to the rotational center axis.

50. The bicycle multiple sprocket assembly according to claim 39, wherein the first recessed tooth is provided on a downstream side of the second recessed tooth in a driving rotational direction in which the bicycle multiple sprocket assembly rotates about the rotational center axis during pedaling.

* * * * *